United States Patent [19]

Terashita

[11] Patent Number: 5,023,656
[45] Date of Patent: Jun. 11, 1991

[54] PHOTOGRAPHIC PRINTING METHOD

[75] Inventor: Takaaki Terashita, Kanagawa, Japan

[73] Assignee: Fuji Photo Film Co., Ltd., Kanagawa, Japan

[21] Appl. No.: 512,281

[22] Filed: Apr. 20, 1990

[30] Foreign Application Priority Data

| Apr. 20, 1989 | [JP] | Japan | 1-100961 |
| Apr. 20, 1989 | [JP] | Japan | 1-100962 |
| Jul. 7, 1989 | [JP] | Japan | 1-176415 |
| Jul. 7, 1989 | [JP] | Japan | 1-176416 |
| Sep. 14, 1989 | [JP] | Japan | 1-238784 |

[51] Int. Cl.$^5$ ............ G03B 27/52; G03B 27/74; G03B 27/80; G03B 27/32
[52] U.S. Cl. ............ 355/41; 355/68; 355/77
[58] Field of Search ............ 355/38, 41, 68, 77; 354/484, 287, 106, 288, 289.1

[56] References Cited

U.S. PATENT DOCUMENTS

| 4,690,548 | 9/1987 | Holm | 355/77 |
| 4,693,591 | 9/1987 | Saijo et al. | 355/41 |
| 4,797,713 | 1/1989 | Terashita et al. | 355/77 |
| 4,841,340 | 6/1989 | Tokuda | 355/38 |
| 4,862,222 | 8/1989 | Staude et al. | 355/77 X |
| 4,912,502 | 3/1990 | Kanji et al. | 355/68 X |
| 4,937,617 | 6/1990 | Kito | 355/41 |
| 4,951,086 | 8/1990 | Hicks | 355/41 |
| 4,965,628 | 10/1990 | Olliver et al. | 355/68 X |
| 4,975,736 | 12/1990 | Kit et al. | 355/77 |

FOREIGN PATENT DOCUMENTS

| 59-31933 | 2/1984 | Japan . |
| 59-65835 | 4/1984 | Japan . |
| 59-29848 | 7/1984 | Japan . |
| 62-58228 | 3/1987 | Japan . |
| 62-255921 | 11/1989 | Japan . |

Primary Examiner—Richard A. Wintercorn
Attorney, Agent, or Firm—Sughrue, Mion, Zinn Macpeak & Seas

[57] ABSTRACT

A recording medium such as a photographic film is recorded with an image of a principal object and distance information of the principal object. The distance information is read during a printing operation for calculating a print exposure amount. In calculating the print exposure amount, a scene of an object image is discriminated in accordance with the object distance, and a calculating equation, which is different for each discriminated scene, is selected for use. Finer discrimination may be conducted by using flash emission data and object brightness data in addition to the distance information. Effective measurement points may be selected from all measurement points within a frame by taking the distance information into consideration, to calculate a print exposure amount by using the selected effective measurement points. A print exposure amount also may be calculated so as to use the distance information of a background image at each divisional frame area, together with the distance information of a principal object image. A characteristic value for each divisional frame area to be used for the calculation is weighted in accordance with a difference between the principal image distance and background image distance.

26 Claims, 19 Drawing Sheets

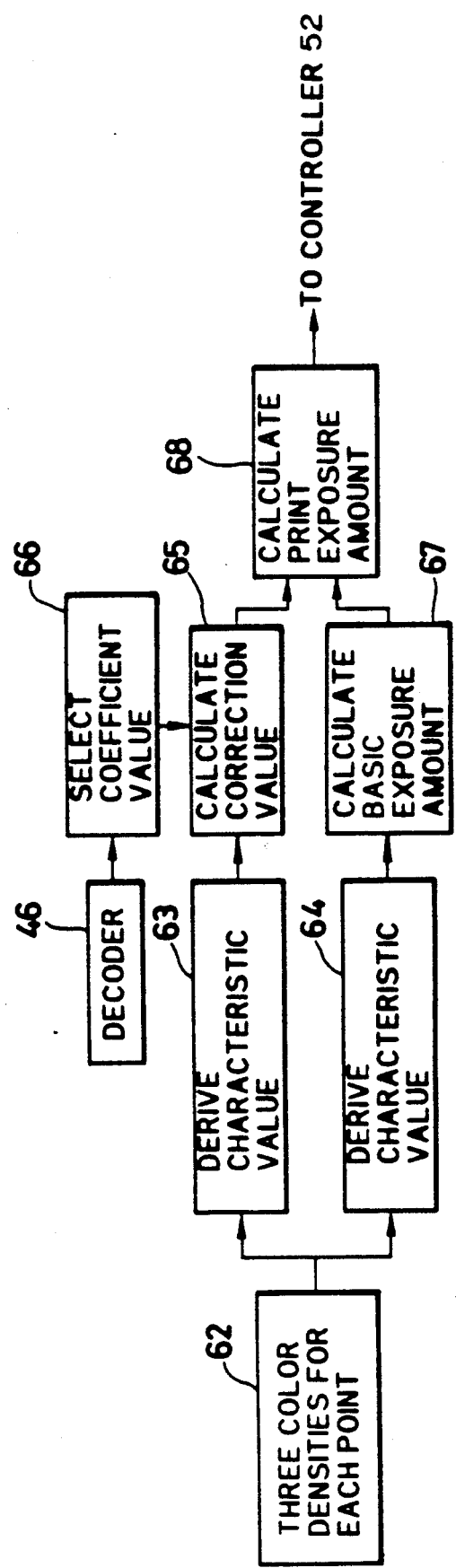

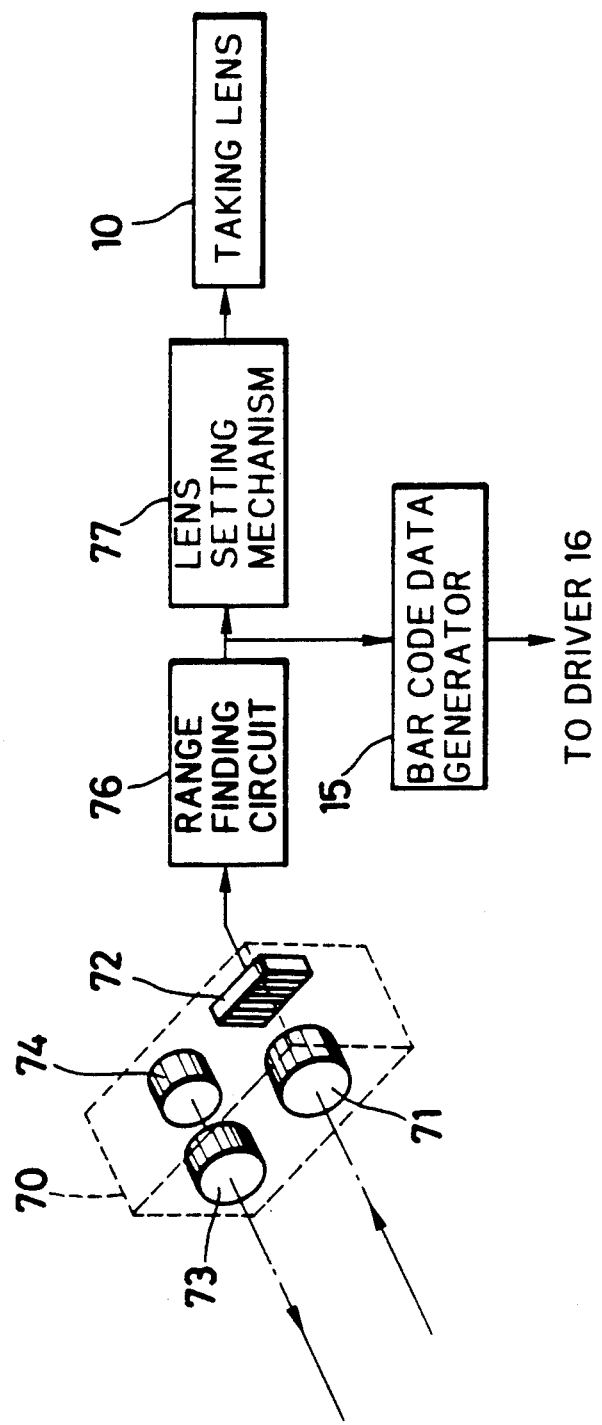

PHOTOGRAPHIC PRINTING METHOD

BACKGROUND OF THE INVENTION

The present invention relates to a photographic printing method and more particularly to a photographic printing method which determines a print exposure amount in accordance with principal object distance information recorded on a recording medium, such as photographic film when the frame image was taken.

In making photographic prints the print exposure amount is determined in accordance with a measured average transmittance density of a frame image recorded in a photographic film. This exposure control is called a large area transmittance density (LATD) method by which about 70% of frame images can be printed while providing proper density and color balance of a principal image or image of principal object (subject). In order to improve the ratio of proper prints to improper prints, recently a scanner has been used for measuring each point on a frame. With such a photographic printer equipped with a scanner, a print exposure amount determined by the LATD method is corrected by using characteristic values including maximum and minimum transmittance densities, and average transmittance densities of virtually divided areas of a frame, which are obtained by measuring transmittance densities (hereinafter simply called densities) of respective points of the frame.

The above-described conventional photographic printing methods determine a print exposure amount suitable for a particular scene by presuming the nature of the scene on the basis of the density of each point on the frame recorded in a photographic film. However, using only the density of each point on a photographic film makes it difficult to discriminate the nature of each scene correctly determine a precise print exposure amount, and obtain a properly finished principal image.

For instance it is necessary to determine the print exposure amount of a landscape scene so as to provide proper density over the whole area of the frame. In contrast, it is necessary to determine the print exposure amount of a figure scene so as to provide proper density of the figure, even at the cost of the improper density of the background image to some degree. However, it is difficult to discriminate between two types of such scenes by using only the density. As a result the density of a scenery image of the landscape scene is too low and the density of a figure image of the figure scene is too high. It is preferable to use a different print exposure amount between a figure scene with only the upper half figure and a figure scene with the whole figure.

Another method is known whereby characteristic values are derived by using the densities of selected measurement points among a plurality of points within a frame. For example according to Japanese Patent Publication No. 59-29848 characteristic values are derived by using a plurality of weighted densities of pairs of two adjacent points having a density difference larger than a predetermined value. According to Japanese Patent Laid-open Publication No. 59-65835. the densities of points having a small density change in a direction from a peripheral portion to a central portion of a frame are excluded in deriving characteristic values.

These methods attempt to presume a principal image by excluding the measurement points having a small contrast. However a principal image does not necessarily have a large contrast, so that these methods also have difficulty in obtaining a principal image having proper density.

There also are two types of scenes which require increased and decreased print exposure amounts, respectively, and cannot be discriminated by using a scanner. For example, a scene taken with a flash at night and a scene taken with underexposure both have a low average transmittance density but the densities of the principal images are different from each other. It is difficult for the scanner photometry to discriminate a principal image and determine a proper print exposure amount for these two scenes. Also, a scene having a principal object in a bright background (such as a white wall, a white sliding door and the like) and taken with a flash or taken synchronously with a flash in daylight, and a scene taken with rear light, both have a high density of background, but the density differences between the backgrounds and principal images are different from each other, and the densities of the principal images are different from each other. The scanner photometry cannot discriminate the principal images of these two types of scenes and cannot determine their proper print exposure amounts.

A method of controlling the exposure amount of a photographic camera in accordance with an object distance also is known. For example, Japanese Patent Laid-open Publication No. 59-31933 describes an exposure control method providing a plurality of range finding areas to measure the distances of objects within the areas. The shortest distance is used as that of a principal object, whereas the other distances are used as those of a background. The brightness of the principal object is compared with that of the background to discriminate a scene and select an exposure program. Also, Japanese Patent Laid-open Publication No. 62-58228 describes an exposure control method whereby a scene is divided into two range finding areas to measure the brightness of each area, and the lower brightness area is selected for the exposure control.

Japanese Patent Laid-open Publication No. 62-255921 describes a method whereby range finding for a scene is carried out at a plurality of range finding areas, and the photometry method is changed in accordance with the range finding results. Specifically, if there is one range finding area in which an object was detected, spot photometry is carried out. If there are a plurality of such range finding areas and an object is not present within the central area, then photometry emphasizing the central area is carried out. If an object is not present within the central area, average photometry at a predetermined area is carried out.

The above methods are applied only to a photographic camera, and not to a photographic printer as the printer is not directed to the object. Also, it should be noted that there are a plurality of images within one frame which may be classified, in accordance with the intent of a photographer, into a primary principal image, a secondary principal image a background image, a foreground image and the like. These images are given different priorities by a photographer, so that it is preferable to print in accordance with the priority order. However at the photographic printer, it is impossible to determine such priority order for printing the images in accordance therewith.

SUMMARY OF THE INVENTION

In view of the foregoing, it is a principal object of the present invention to provide a photographic printing method that is capable of discriminating a principal image correctly and performing precise exposure control by taking into consideration distance information of an object.

It is another object of the invention to provide a photographic printing method that is capable of printing a principal image properly by classifying scenes in accordance with the distance information.

It is a further object of the invention to provide a photographic printing method that is capable of determining a proper print exposure amount in accordance with the characteristics of a scene.

It is a still further object of the invention to provide a photographic printing method that is capable of obtaining a properly finished print not only of a principal image but also of all other images.

The above and other objects and advantages of the invention are achieved by recording the distance information of an object on a photographic film when the object is photographed, and controlling the print exposure amount in accordance with the distance information read from the film when it is printed. The distance information may use a numerical metric value, or a code representative of a particular zone among a plurality of zones in the range of an object distance. The distance information may be represented by a bar code, a mark code a character, or the like.

According to a preferred embodiment of the invention, while taking into consideration the distance information read from a photographic film, unnecessary measurement points are excluded and the characteristic values are derived from the photometric values at the remaining measurement points in order to calculate a print exposure amount.

According to yet another embodiment of the invention, the distance information flash emission data and object brightness data are recorded when an object is photographed, and the scene of a frame is discriminated in accordance with these data. A print exposure amount calculation method prepared for that scene is selected to calculate a print exposure amount.

According to still another embodiment the distance information of an object within each range finding area, and the focussed object distance (in-focus distance) information are recorded in a recording medium, the focussed object distance being the distance at which the taking lens has been focussed. For the printing operation, the recorded information is read to control a print exposure amount. Controlling a print exposure amount by using the distance information may be carried out in various ways. For example, characteristic values are obtained for respective divisional frame areas corresponding to range finding areas, the characteristic values are weighted in accordance with the differences between the distances of the range finding areas corresponding to the divisional frame areas and the focussed object distance, and a print exposure amount is calculated with the weighted characteristic values.

BRIEF DESCRIPTION OF THE DRAWINGS

The above objects and advantages of the present invention will become apparent from the following detailed description when read in connection with the accompanying drawings, in which:

FIG. 4 is a functional block diagram illustrating the operation unit used with the photographic printer shown in FIG. 3:

FIG. 6 is a schematic diagram showing an automatic focussing device;

DETAILED DESCRIPTION OF THE PREFERRED EMBODIMENTS

Figure 1:
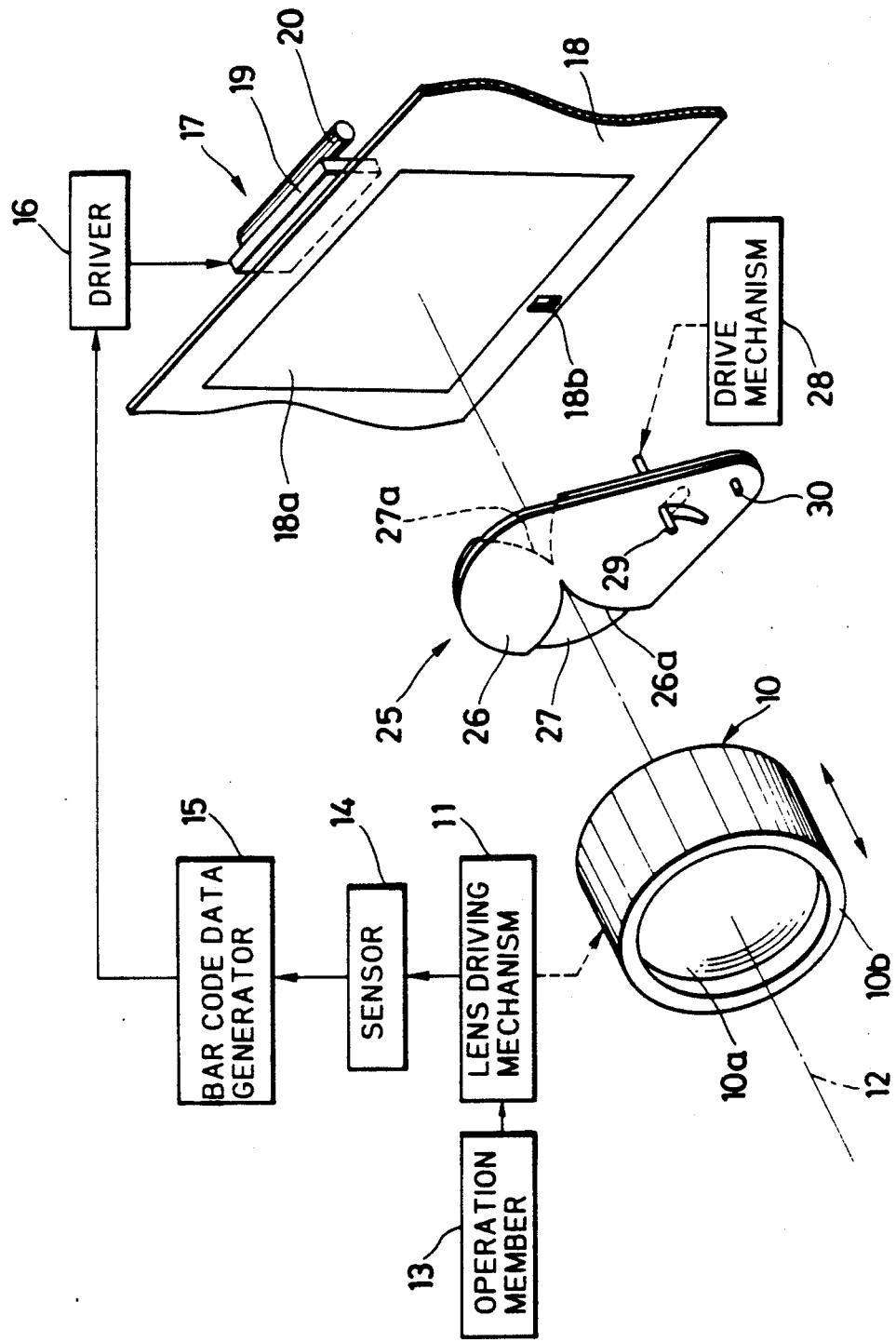
FIG. 1 is a schematic diagram showing an example of a photographic camera which records the distance information of a principal object.

FIG. 1 shows a photographic camera which records the distance information of a principal object from the camera. In the camera, a taking lens 10 is constructed of an optical system 10a and a lens barrel 10b for holding the optical system 10a. The taking lens 10 is moved along the optical axis 12 by a lens driving mechanism 11 which is driven by an operation member 13 in cooperative association with, e.g., a range finder. The lens driving mechanism 11 also activates a sensor 14, such as a potentiometer, to convert the motion amount (linear displacement or rotation amount) of the taking lens 10 into an electric signal. The sensor 14 may detect the position of the operation member 13 or taking lens 10 in another way, as desired. Also, in addition to the sensor 14 which detects the amount of linear motion of the taking lens 10 another type of sensor may be used which generates a different signal for each range of a plurality of ranges for possible motion of the taking lens 10.

An output signal from the sensor 14 is sent to a bar code data generator 15, and is converted into bar code data which then is sent to a driver 16. The driver 16 drives a bar code recorder 17 which records, as a bar code on a photographic film 18, information on the distance of a principal object from the camera. In this embodiment, the bar code recorder 17 is constructed of a liquid crystal display 19 for displaying a bar code and a flash bulb 20 for applying a flash to the displayed bar code. The distance information of a principal object is recorded at the area between the frame 18a and the film edge at the same time as, or slightly before or after the object is photographed.

In this embodiment, although a bar code is recorded while the photographic film 18 remains still, it may be recorded in synchronism with feeding the photographic film 18, in which case only one bar is sufficient as a bar code, for the bar code recorder 17 to record, thus simplifying the structure thereof.

A shutter 25 is disposed at the back of the taking lens 10. This shutter 25 is constructed of, e.g., two shutter blades 26 and 27 having respective recesses 26a and 27a formed therein The shutter blades 26 and 27 are moved by a drive mechanism 28 such that they are pivoted in opposite directions about a fixed pin 30, while a movable pin 29 is moved toward the fixed pin 30, thereby creating an aperture where the recesses 26a and 27a are superposed on each other. Light passed through this aperture becomes incident on the photographic film 18 to photograph the object.

Figure 2:
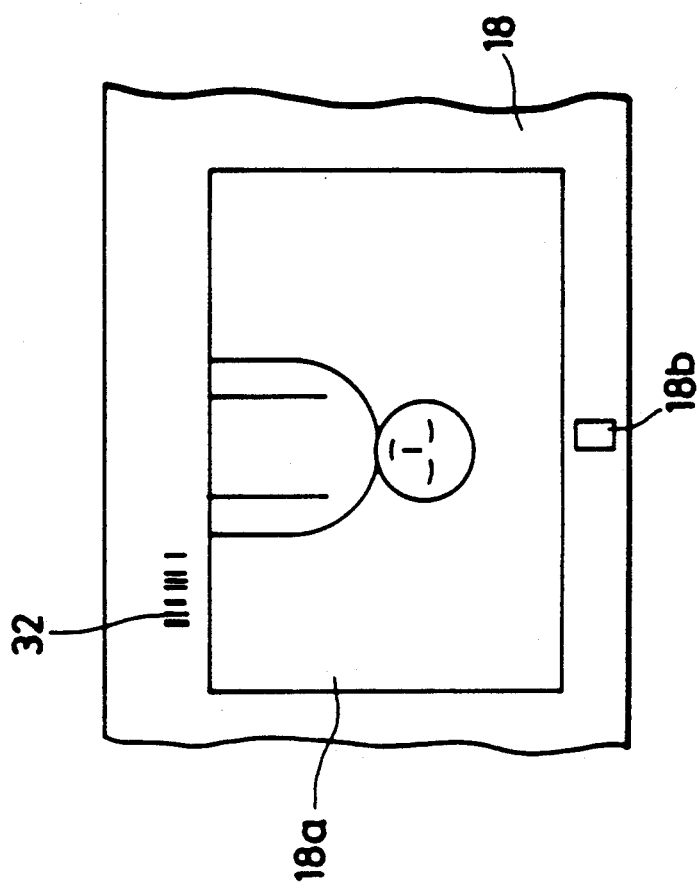
FIG. 2 shows an example of a photographic film recorded with an object taken with the photographic camera shown in FIG. 1.

FIG. 2 shows an example of a photographic film with the distance information recorded thereon This photographic film 18 is formed with perforation 18b at a constant pitch. The perforation 18b is detected by a sensor of a feed stop device (not shown) so as to control feeding the film by one frame at a time. Distance information 32 of a principal object is recorded on a side of the frame opposite the perforations 18b in the form of a bar code. The bar code is made visible by the development process. Instead of a bar code, the distance information 32 may be represented by a symbol, a numerical value or the like. It also is possible to use a light emitting diode to record a mark at a position displaced from a reference position by an amount corresponding to the focussed object distance.

Figure 3:
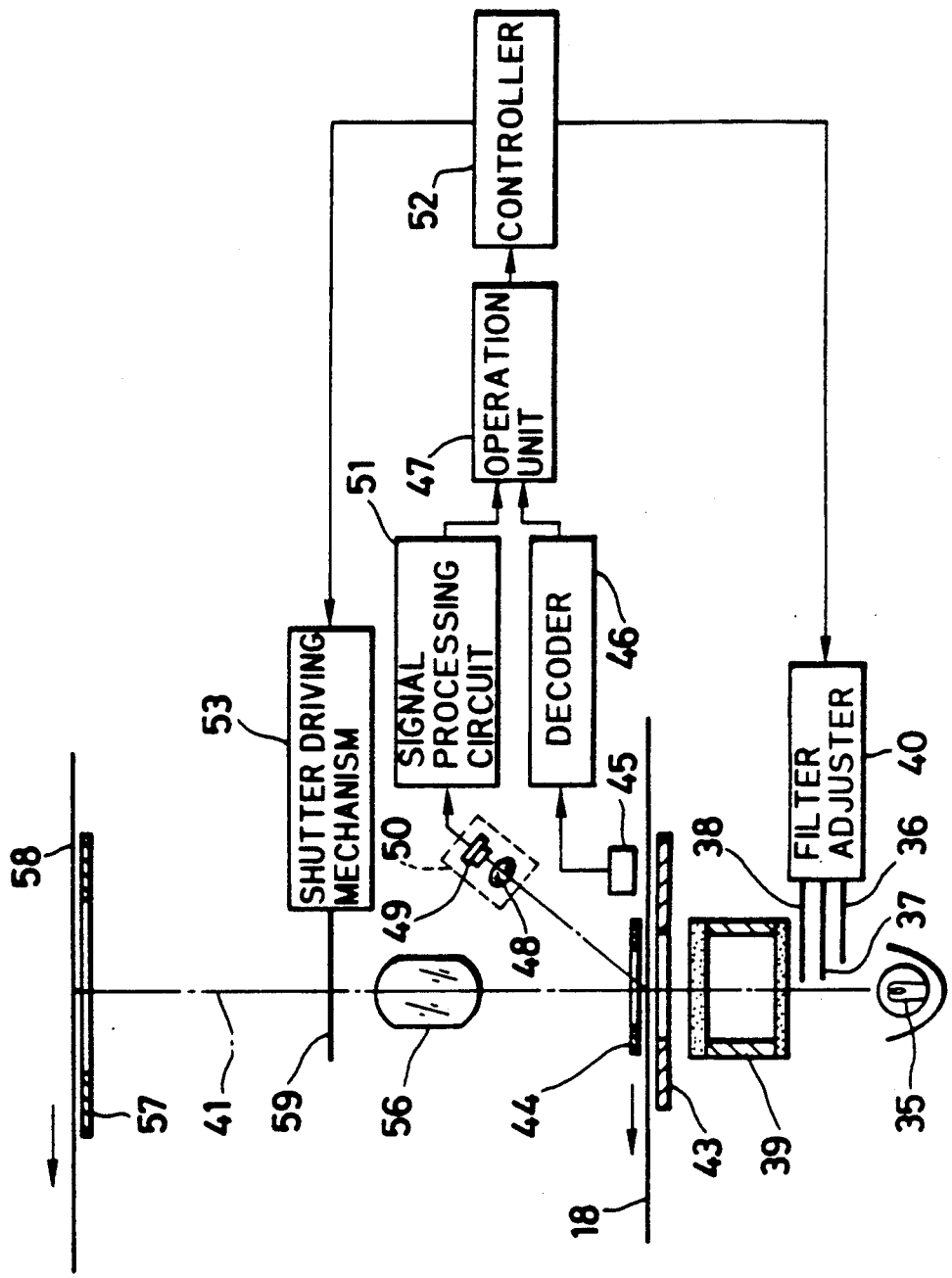
FIG. 3 is a schematic diagram showing an example of a photographic printer for making a print by using the photographic film shown in FIG. 2.

FIG. 3 illustrates a photographic printer, in which a white light radiated from a light source 35 passes through a cyan filter 36, a magenta filter 37, and a yellow filter 38, and enters a mixing box 39. The degree of insertion of these color filters 36 to 38 into an optical path 41 is controlled by a filter adjuster 40 so that three color components and intensities of a printing light are regulated. The mixing box 39 is constructed of a rectangular tube having an inner mirror surface and diffusion plates mounted on both opposite ends of the rectangular tube.

A film carrier 43 is set at the printing stage. A developed photographic film 18 is set at the printing state and is illuminated with light transmitted through the mixing box 39. A film mask 44 is mounted at the printing stage 43 to ensure the evenness of the photographic film 18. This film mask 44 is formed with an opening corresponding to the size of a frame as well known in the art. The film mask 44 is raised up by a solenoid (not shown) while the photographic film 18 is being fed, and then is lowered to press the photographic film 18 during the printing operation. A bar code reader 45 is mounted at the upstream portion of the printing stage to read the distance information 32 recorded for the frame while the photographic film 18 is fed to the printing stage. The read distance information is decoded by a decoder 46 and is sent to an operation unit 47.

A scanner 50 is disposed above and upstream from the printing stage The scanner 50, constructed of a lens 48 and an image area sensor 49, measures the amount of light transmitted through each measurement point of the frame set at the printing stage. A signal from the scanner 50 is sent to a signal processing circuit 51, and is subjected to logarithmic and digital conversion. The light amount is converted logarithmically into a density (strictly speaking, a logarithmically converted value corresponding to the density). A signal outputted from the signal processing circuit 51 is sent to the operation unit 47, which calculates a print exposure amount for each color. A controller 52 adjusts the setting positions of the color correction filters 36 to 38 in accordance with the print exposure amounts of three colors calculated by the operation unit 47. The controller 52 also controls various parts such as a shutter driver 53, as well as the filter adjuster 40.

A printing lens 56 is disposed above the printing stage to enlarge and project an image in a specified frame onto a color paper 58 positioned at the back of a paper mask 57. Between the printing lens 56 and color paper 58, there is disposed a shutter 59 whose open/close operation is controlled by the shutter driver 53.

FIG. 4 illustrates the function of the operation unit 47. A memory 62 has stored therein three color densities (a red color density, a green color density, and a blue color density) for respective measurement points measured by the scanner 50. A first characteristic value deriving unit 63 derives characteristic values to be used for calculating a correction amount $\Delta E$, and a second characteristic value deriving unit 64 derives characteristic values to be used for calculating a basic exposure amount $EB_i$ (i representing one of red, green, and blue colors).

A correction amount calculating unit 65 selects a correction amount calculating equation, provided for each scene, and discriminated in accordance with the distance to the principal object. In this embodiment, a common correction amount calculating equation is used for all scenes, and coefficients stored in a memory 66 are selected in accordance with the distance information from the decoder 46. Representing the coefficients as $KA_0$ to $KA_6$, the following correction amount calculating equation may be used, for example:

$$\Delta KA_0 + KA_1 \cdot Dmx + KA_2 \cdot Dmn + KA_3 \cdot Dm + KA_4 \cdot Dc + KA_5 \cdot Dl + KA_6 \cdot Du$$

(1)

where

Dmx: maximum density within a frame,
Dmn: minimum density within a frame,
Dm: average density of the whole area of a frame, i.e. LATD,
Dc: average density of the central area of a frame,
Dl: average density of the lower half area of a frame,
Du: average density of the upper half area of a frame.

Figure 5A:
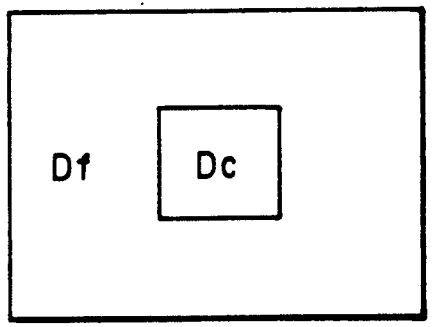
FIGS. 5A to 5C illustrate ways of dividing a frame.
Figure 5B:
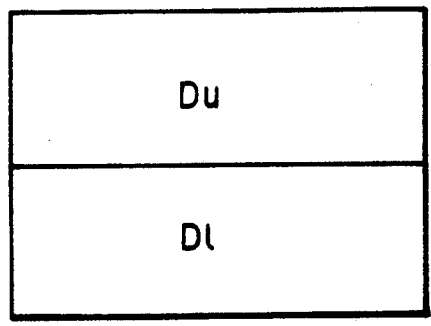

The respective areas from which the average densities are taken are illustrated in FIGS. 5A and 5B. Each density is a grey density obtained from the arithmetic mean value of three color densities. In classifying the distance L (in metric units) to a principal object into four steps including a near distance (L<2) a middle distance 2<L<4). a medium-far distance (4≦L<10), and a far distance (10≦L), the coefficients $KA_0$ to $KA_6$ may take the following values by way of example:

|     | L < 2 | 2 ≦ L < 4 | 4 ≦ L < 10 | 10 ≦ L |
|-----|-------|-----------|------------|--------|
| KA0 | 0.77  | 0.74      | 0.27       | −0.69  |
| KA1 | 0.08  | 0.07      | 0.04       | 0.04   |
| KA2 | 0.03  | 0.04      | 0.04       | 0.03   |
| KA3 | −0.06 | −0.12     | −0.24      | −0.14  |
| KA4 | 0.04  | 0.04      | 0.07       | 0.04   |
| KA5 | 0     | 0.04      | 0          | 0.05   |
| KA6 | −0.07 | −0.02     | −0.05      | 0      |

Many scenes at the near and middle distances usually are printed with an increased print exposure amount so that $KA_0$ and $KA_1$ are rather large and $KA_3$ is rather small relative to those scenes at the medium-far and far distances. Conventionally, these scenes cannot be discriminated automatically but are processed as the same kind of scene, so that a proper print exposure amount $E_i$ cannot be determined.

Another example of the correction amount calculating equation is given by:

$$\Delta E = F_1(L) + F_2(L) \cdot Dmx + KB_1 \cdot Dmn + F_3(L) \cdot Dm + KB_2 \cdot Dc + KB_3 \cdot (Dl - Du) \quad (2)$$

where $F_1(L)$ to $F_3(L)$ are the functions relative to an objective distance L, and $KB_1$ to $KB_3$ are coefficients which may take the following values:

$$F_1(L) = 1.20 - 0.15 \times L$$

$$F_2(L) = 0.10 - 0.002 \times L$$

$$F_3(L) = -0.05 - 0.02 \times L$$

$$KB_1 = 0.03$$

$$KB_2 = 0.05$$

$$KB_3 = 0.03$$

Referring again to FIG. 4, a basic exposure amount calculating unit 67 calculates the basic exposure amount $EB_i$ by using the characteristic values obtained by the second characteristic value deriving unit 64. An example of a basic exposure value calculating equation is given by:

$$EB_i = \alpha_i \cdot (D_i - DN_i) + \beta_i \quad (3)$$

where
α: a slope coefficient,
β: a constant determined by a particular combination of photographic film, color paper and printing lens,
DN: an average density of a control negative film, and
D: an average density of a frame to be printed.

A correction amount calculating unit 68 corrects the basic exposure amount $EB_i$ by using the correction amount ΔE to obtain an optimum print exposure amount $E_i$ suitable for a scene discriminated by the focussed object distance If one step of a density correction key corresponds to 20% of the exposure amount, the following equation is used:

$$E_i = EB_i (1.20)^{\Delta E} \quad (4)$$

Next, the operation of the embodiment described above will be given. In taking a photograph, a camera is directed to a principal object, and a desired layout is determined, and thereafter the operation member 13 is actuated in accordance with the distance to the principal object. Upon actuation of the operation member 13, the taking lens 10 is moved along the optical axis 12 by means of the lens driving mechanism 11, and the focal point of the lens 10 is adjusted so that the principal object is made clear on the photographic film 18. Upon this focal adjustment, the sensor 14 detects the position of the taking lens 10 and sends a detected signal to the bar code data generator 15.

As is well known, upon depression of the release button, the drive mechanism 28 causes the drive pin 29 to move reciprocally so as to open and close the shutter 25 to photograph an object. Simultaneously with or slightly before or after this photographing, the bar code data generator 15 converts the distance to the principal object into a bar code which then is sent to the driver 16. The driver 16 drives the bar code recorder 17 to display the distance information represented by a bar code on the liquid crystal display 19. After the bar code display becomes stable, the flash bulb 20 is illuminated to record the distance information 32 at the peripheral portion of the frame 18a, as shown in FIG. 2. After photographing objects for all frames of the photographic film 18, the film is removed from the photographic camera and is sent to a laboratory. At the laboratory, the photographic film 18 is developed to visualize latent images of an object image and distance information recorded in each frame.

The developed photographic film 18 is mounted on the film carrier 43 of the photographic printer shown in FIG. 3 to set a frame to be printed, e.g. frame 18a, to the printing stage. Immediately before the frame 18a is fed to the printing stage, the bar code reader 45 reads the distance information 32 recorded at the peripheral portion of the frame 18a. The read distance information is decoded by the decoder 45 and is sent to the operation unit 47. The operation unit 47 selects the coefficients $KA_0$ to $KA_6$ in accordance with the scene discriminated by the object distance.

When the frame 18a has been set at the printing stage, the scanner 50 measures the transmitted red, green, and blue light amounts for each measurement point of the frame 18a. The three color photometric values are converted into the densities by the signal processing circuit 51, and are sent to the operation unit 47. The operation unit 47 calculates the characteristic values Dmx, Dmn, Dm, Dc, Dl, and Du by using the three color densities for respective measurement points. The calculated characteristic values are substituted into the correction amount calculating equation (1) which has its coefficients selected in accordance with the distance information, so as to calculate the correction amount ΔE. The operation unit 47 also calculates the characteristic value $Di$ which is used to calculate the basic exposure amount EB$i$. The basic exposure amount EB$_i$ is corrected using the correction amount ΔE to obtain the print exposure amount E$_i$.

The print exposure amount E$_i$, obtained on the basis of the scene discriminated by the object distance is sent to the controller 52 which then adjusts the insertion amount of the color correction filters 36 to 38 into the optical path 41 in accordance with the print exposure amount E$_i$. After adjusting the filters, the shutter 59 is opened for a predetermined time so as to print the frame 18a on the color paper 58. The other frames are printed sequentially in a similar manner.

The focus adjustment of the taking lens 10 may be carried out automatically by using an automatic focusing device, as shown in FIG. 6. A range finder unit 70 is constructed of a light receiving unit having a lens 71 and line sensor 72 and a light projecting unit having a lens 73 and light source 74. During the range finding operation which is effected by half-depressing the release button, a near infrared spot light is projected from the light projecting unit toward a principal object, and the reflected light becomes incident on the line sensor 72. An output signal from the line sensor 72 is sent to a range finding circuit 76 which checks on what position of the line sensor 72 the reflected light was incident, thereby detecting the distance from the camera to the principal object. This object distance signal is sent to a lens setting mechanism 77 which upon full depression of the release button, sets the taking lens 10 at a position corresponding to the object distance The object distance signal outputted from the range finding circuit 76 also is sent to the bar code data generator 15 to record the distance information 32 on the photographic film 18, as described previously. This range finding relies upon the optical trigonometrical survey just described However, other range finding techniques may be used such as ultrasonic range finding which measures the propagation time of an ultrasonic wave.

The size of a principal object in a frame changes with an object distance. Accordingly, a principal object can be discriminated by using the distance information while excluding unnecessary measurement points constituting the background image. According to one method of excluding unnecessary measurement points, a frame is divided into a non-judgment area and a judgment area in accordance with an object distance, and all measurement points are used within the non-judgement area, whereas within the judgement area, if the contrast of two adjacent measurement points is within a reference value, these points are excluded as unnecessary points. According to another method, the judgement of contrast is carried out for the whole area of a frame, and the reference value is changed with an object distance. Alternatively, an effective area of a frame to be printed is selected in accordance with the distance information, and characteristic values for use in calculating a print exposure amount are derived by using photometric values at respective measurement points within the effective area.

Figure 7:
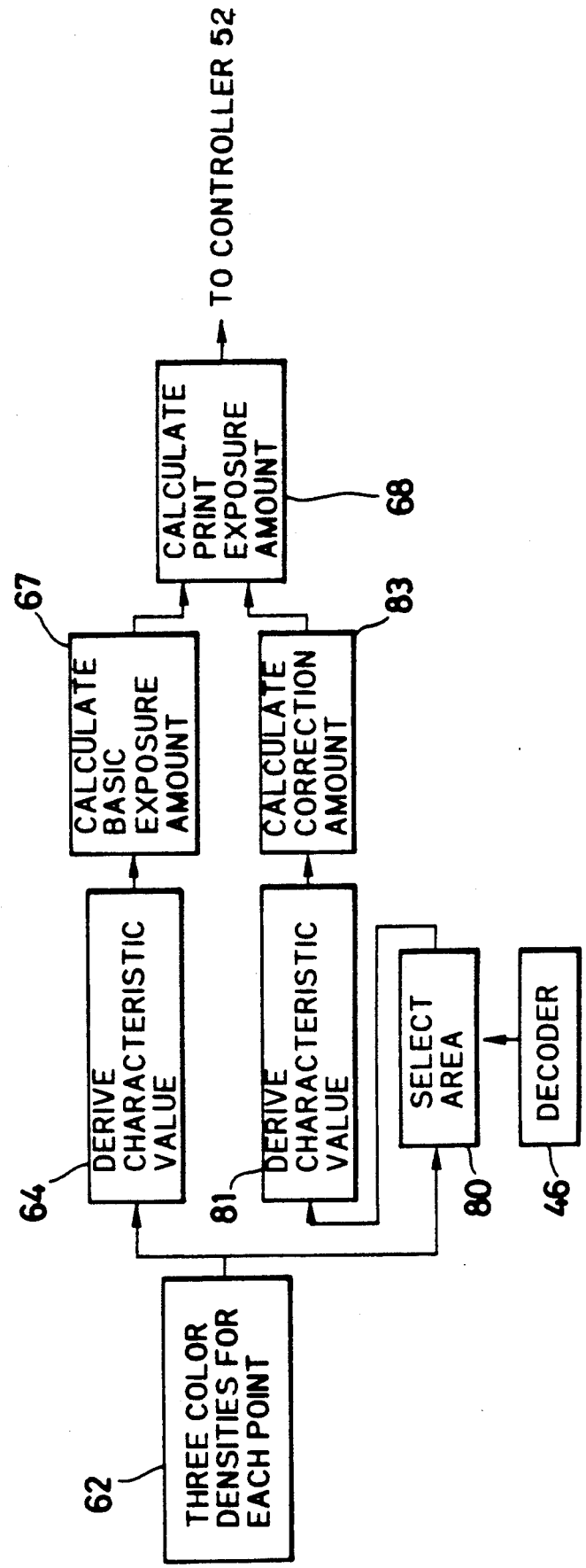
FIG. 7 is a functional block diagram of the operation unit in another embodiment for deriving characteristic values from the effective area discriminated in accordance with the distance information.

FIG. 7 shows an embodiment wherein measurement points are selected in accordance with the distance information. Elements which are the same as those shown in FIG. 4 are represented by identical reference numerals. A frame is divided into a plurality of divisional areas. An area selector 80 selects an area in accordance with the distance information from the decoder 46. The densities at respective measurement points within the selected area are sent to a characteristic value deriving unit 31 to derive characteristic values for the calculation of the correction amount ΔE. Similarly to the embodiment shown in FIG. 4, the densities at all measurement points within the frame are sent to the characteristic value deriving unit 64.

The basic exposure amount calculating unit 67 calculates the basic exposure amount EB$_i$ by using the characteristic values derived by the characteristic value deriving unit 64. A correction amount calculating unit 83 calculates the correction amount ΔE by using the characteristic values derived by the characteristic value deriving unit 81, and sends the correction amount to a print exposure amount calculating unit 68. The print exposure amount calculating unit 68 uses the calculating equation (4) to obtain the print exposure amount E$_i$ in a manner similar to the embodiment shown in FIG. 4. The setting positions of the color correction filters 36 to 38 are adjusted in accordance with the calculated print exposure amount E$_i$.

The area selector 80 determines the background area in accordance with an object distance L, and excludes the background area as an unnecessary area. The remaining effective area i.e., principal object image area, is used to derive the characteristic values. Examples of unnecessary areas are shown in FIGS. 8A to 8D.

Figure 8A:
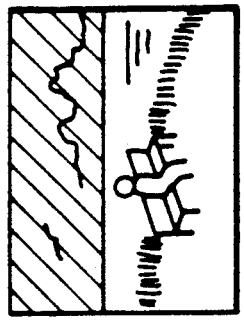
FIGS. 8A to 8D show examples of unnecessary divisional frame areas determined by range finding areas.

(1) 10 m ≦ L FIG. 8A

Most of the scenes being distant images, the effective area is the whole area of a frame.

Figure 8B:
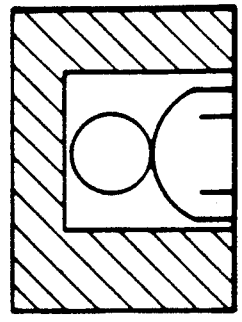

(2) 5 m ≦ L < 10 m FIG. 8B.

Most of the scenes being scenery portraits the effective area is the remainder of a frame excluding the hatched upper portion.

Figure 8C:
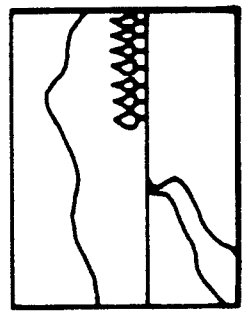

(3) 2m ≦ L < 5 m FIG. 8C.

Most of the scenes being full figure portraits, the effective area is the remainder of a frame excluding the hatched peripheral portion.

Figure 8D:
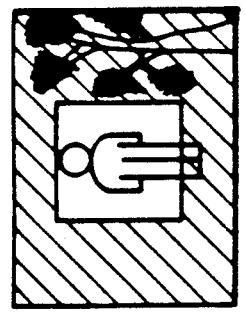

(b 4) L < 2 m FIG. 8D

Most of the scenes being upper figure portraits, the effective area is the remainder of a frame excluding the hatched upper and right/left portions.

A maximum density minimum density, average density, density histogram shape color, and the like are used as characteristic values. A correction amount is calculated using a correction amount calculating equation having these characteristic values. An example of such a correction amount calculating equation is given by:

$$\Delta E = KC_0 + KC_1 \cdot DSmx + KC_2 \cdot DSmn + KC_3 \cdot DSm \qquad (5)$$

where 3
DSmx: a maximum density within a selected area.
DSmn: a minimum density within a selected area,
DSm: an average density for a selected area.

Grey densities are used as these characteristic values. The coefficients $KC_0$ to $KC_3$ may take the following values:

$$KC_0 = 0.40$$

$$KC_1 = 0.03$$

$$KC_2 = 0.02$$

$$KC_3 = 0.04$$

An average density Dm for the whole area of a frame multiplied by a coefficient, e.g., "−0.10 Dm" may be added to the correction amount calculating equation (5). The average density for the excluded background may be used with the correction amount calculating equation.

In the above embodiment, an effective area is determined in accordance with the range of an object distance, and characteristic values used for the calculation of a correction amount are derived by using densities at respective points within the effective area. Instead of unconditionally excluding the unnecessary area, characteristic values may be derived by using densities at significant measurement points, even within the unnecessary area, and the densities at all points within the effective area. According to a method of selecting significant measurement points within an unnecessary area, as disclosed for example in Japanese Patent Publication No. 59-29848 two adjacent measurement points are determined as significant points if they satisfy $$|D_{j+1} - D_j| < TH \qquad (6)$$

where $D_j$ and $D_{j+1}$ are the grey densities at the two points, TH is a reference value and j and j+1 are the positions of a measurement point The density comparison may be carried out in a direction from the peripheral portion to the center of a frame as disclosed in Japanese Patent Laid-open Publication No. 59-65835.

Figure 9:
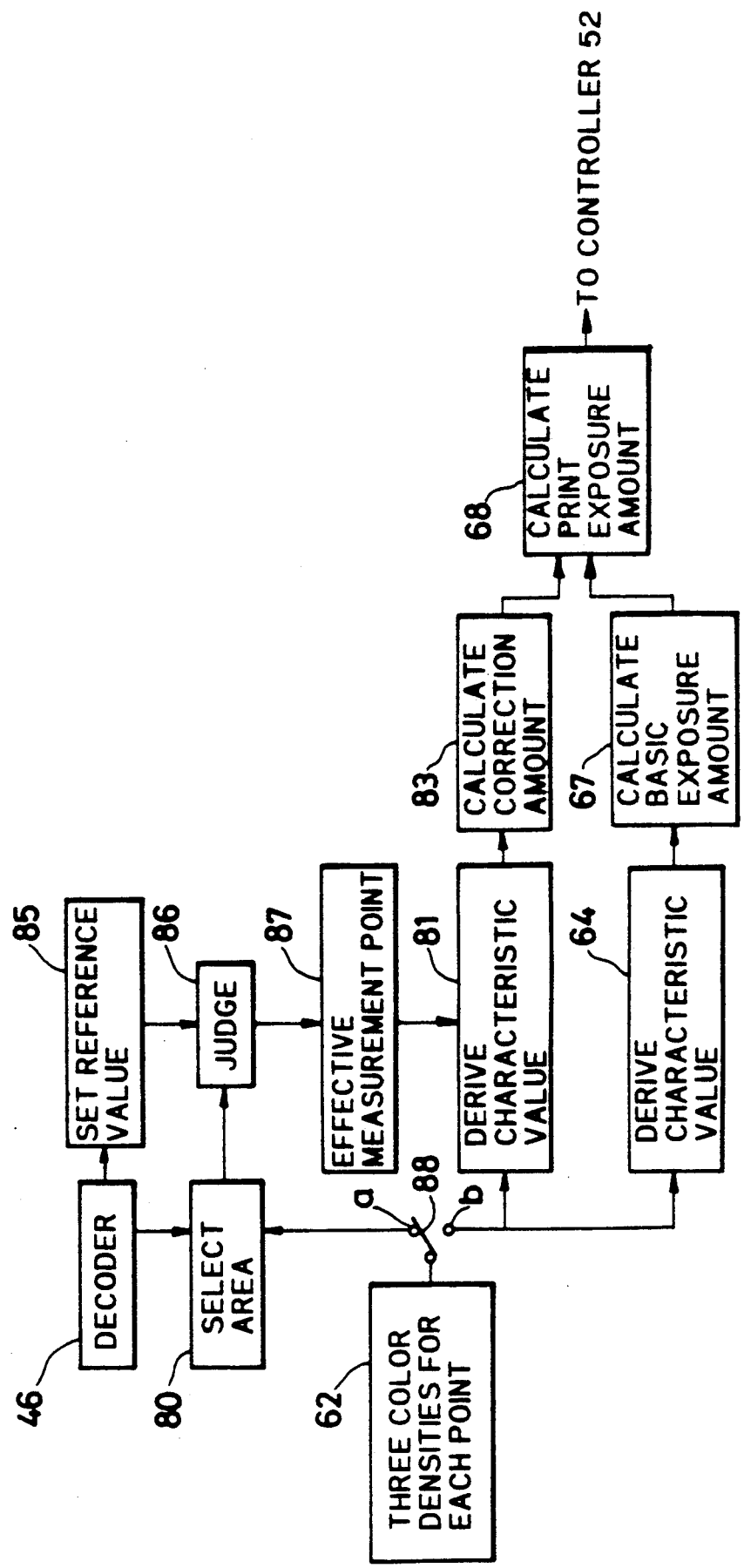
FIG. 9 is a functional block diagram of the operation unit in another embodiment for deriving effective measurement points from an unnecessary divisional area.

The background image taken from a far distance is likely to have a broad area such as the sky and the sea, or a micro pattern such as mountains whereas the background image taken from a near distance is likely to have a macro pattern. In view of this, it is preferable to change the reference value TH in accordance with the range of an object distance. FIG. 9 shows an embodiment for such a case, wherein elements the same as those shown in FIG. 7 are represented by using identical reference numerals. In accordance with the distance information from the decoder 46, a reference value setting unit 85 sets a reference value TH and sends it to a judgement unit 86. The area selector 80 determines an unnecessary area in accordance with the distance information. The grey densities at respective measurement points within the unnecessary area are sent to the judgement unit 86 which compares the grey density at each point with the reference value TH. If the conditional formula (6) is satisfied, then the corresponding point is stored in a memory 87 as an effective measurement point.

In deriving characteristic values, a selector 88 is switched from contact a to contact b to send three color densities at each point to the characteristic value deriving units 64 and 81. The characteristic value deriving unit 81 reads from the memory 62 only the three color densities corresponding to the effective measurement point stored in the memory 87, thereby to derive characteristic values to be used in calculating the correction amount. As described previously, the characteristic value deriving unit 64 derives the characteristic values to be used in calculating the basic exposure amount which is corrected by the correction amount.

An example of the relationship between the range of an object distance and a reference value TH is:
(1) L > 10 m TH = 0.03
(2) 5 m ≤ L ≤ 10 m TH = 0.05
(3) L < 5m TH = 0.08

In the above embodiment, the distance information is used to determine an area within which all or a part of measurement points is excluded. Instead of designating a particular area, measurement points to be excluded may be designated. For instance, most of the principal images taken at a near distance are figures so that measurement points having a very high density are excluded in order to exclude a strongly reflected light, window, sky white clothes or the like. In this case, object brightness information is recorded on a photographic film, and in accordance with the recorded information, the measurement points expected to have a high brightness are excluded. Further, unnecessary measurement points may be excluded in accordance with contrast. In this case, the reference value TH may be changed with the range of an object distance.

Figure 10:
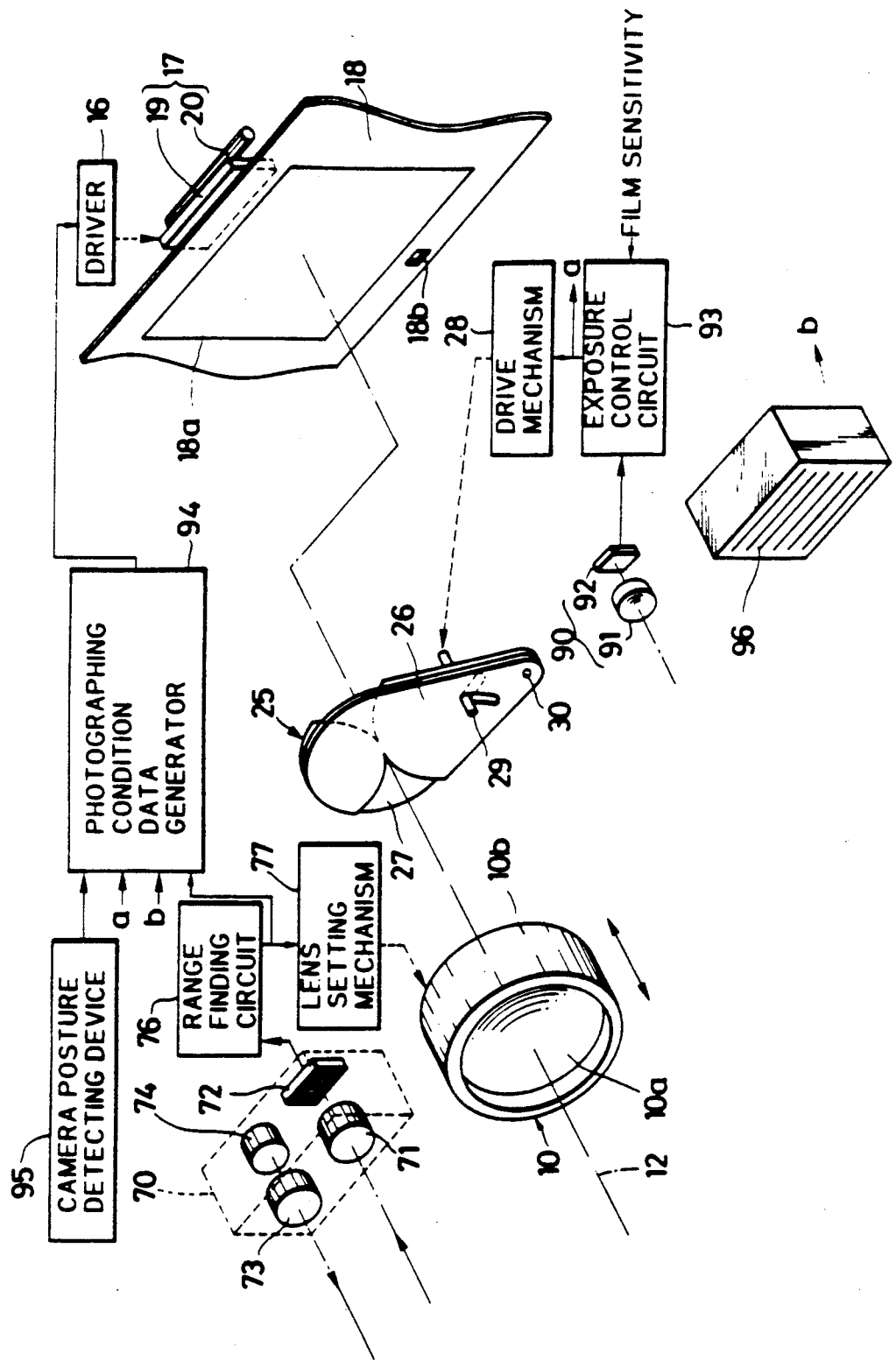
FIG. 10 is a schematic diagram showing a photographic camera for recording flash emission information, camera posture information and object brightness information, as well as the distance information.

FIGS. 10 to 16 show another embodiment wherein the photographing conditions, such as the distance information, are recorded at the time of photographing, and are read at the time of printing to discriminate a scene and calculate the print exposure amount. In FIG. 10 showing a photographic camera, elements which are the same as those shown in the foregoing embodiments are represented by identical reference numerals. A photometric unit 90 is constructed of a lens 91 and a light receiving element 92. While a release button (not shown) is being half depressed, the object brightness value (BV) is measured. An object brightness signal outputted from the light receiving element 92 is sent to an exposure control circuit 93 which calculates a light value (LV) by using the object brightness value and the film sensitivity to program-control the shutter mechanism 25 via the drive mechanism 28. With the same film sensitivity, the light value is proportional to the object brightness. Consequently, in this embodiment, the light value is used as the object brightness data which is sent to a photographing condition data generator 94.

Figure 12:
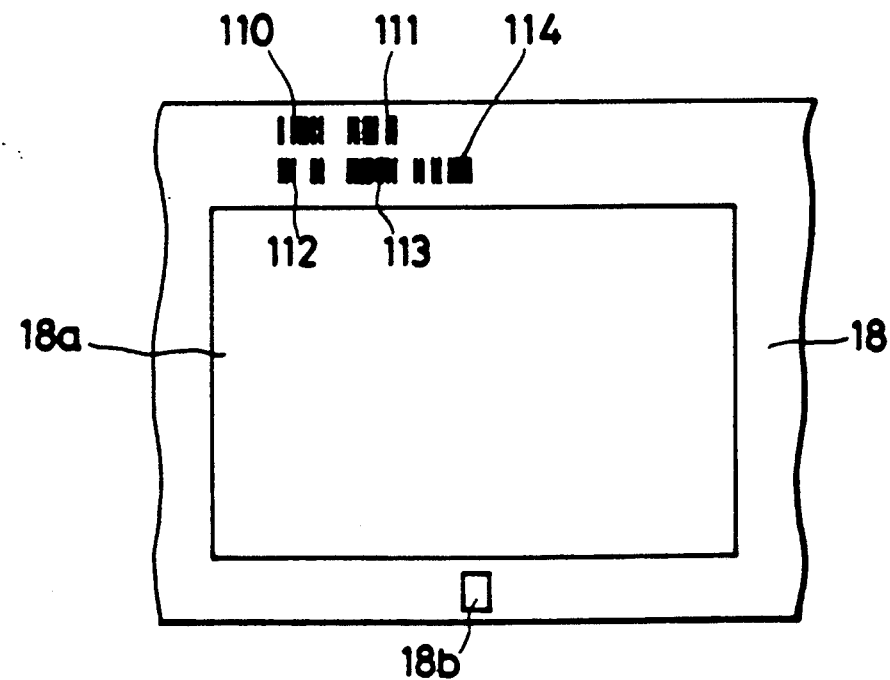
FIG. 12 illustrates a photographic film recorded with an object taken with the photographic camera shown in FIG. 10.

The object distance signal from the range finding circuit 76 is sent to the photographing condition data generator 94 to which a camera posture signal, detected by a camera posture detecting device 95, and a flash emission signal outputted from a flash unit 96, also are supplied. The photographing condition data generator 94 causes the driver 16 to drive the bar code recorder 17 so that the photographing condition data represented by a bar code is recorded in the photographic film 18. FIG. 12 shows examples of photographic condition data recorded in the photographic film 18, the data including flash emission data 110, object brightness data 111, object distance data 112, camera posture data 113 and frame number data 114 represented by respective bar codes.

Here, "camera posture" means one condition of the camera being held, either in a normal position, or with either the right or left side raised up.

The flash unit 96 has an object brightness discrimination circuit, as is well known in the art, and automatically emits a light in synchronism with the shutter mechanism 25 when the object has a low brightness. Even if an object is very bright the flash unit 96 emits light upon turning on a daylight synchro switch (not shown).

Figure 11:
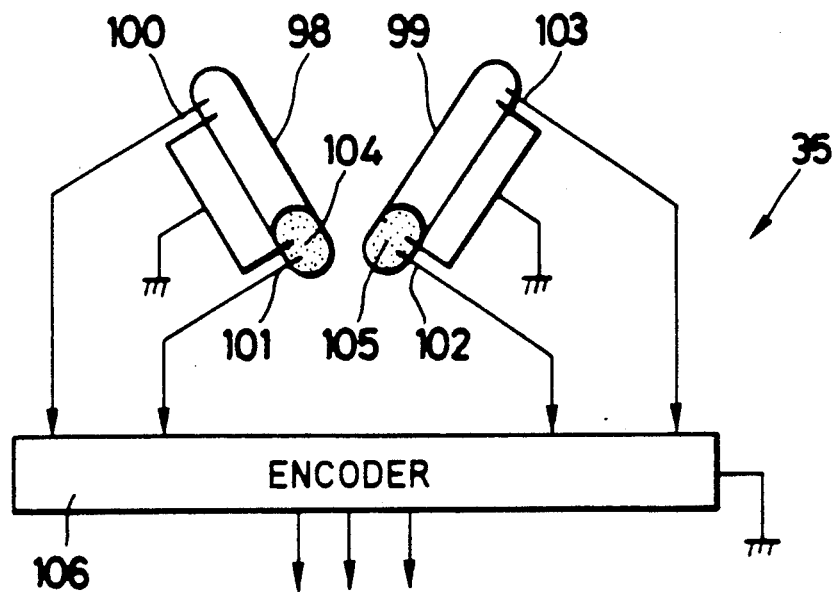
FIG. 11 illustrates in greater detail a camera posture detection unit shown in FIG. 10.

FIG. 11 shows the camera posture detecting device. Two glass tubes 98 and 99 are mounted so as to form a V-shape in a plane parallel to the photographic film 18, i.e., in the plane extending from the top to the bottom of the camera body (not shown). Opposite ends of the glass tubes have contact pairs 100, 101, 102, and 103 mounted thereon Mercury 104 and 105 is enclosed in the glass tubes 98 and 99 to allow each of the contact pairs 100 to 103 to be in contact.

When the camera is positioned horizontally, the contact pairs 102 and 104 are on, as shown in FIG. 11. When the camera body is positioned vertically by raising the photographer's right hand which, together with the left hand holds the camera, the contact pairs 101 and 103 are on. When the camera body is positioned vertically by raising the photographer's left hand, the contact pairs 100 and 102 are on. These contact pairs 100 to 103 are connected to an encoder 106 which outputs a signal representative of the camera posture and sends it to the photographing condition data generator 94.

Figure 5C:
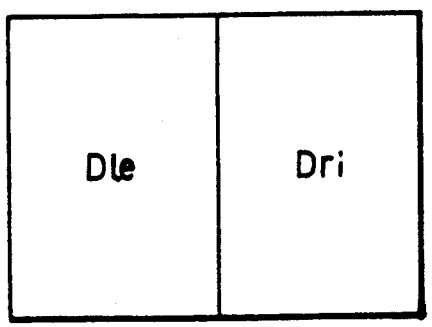
Figure 13:
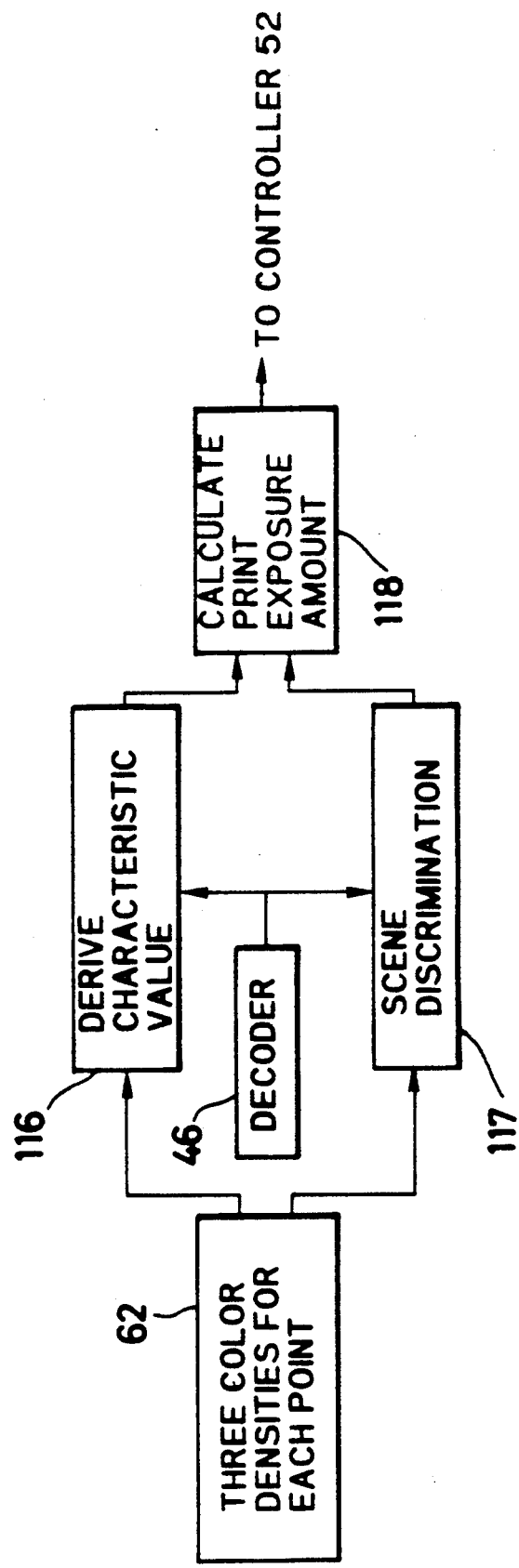
FIG. 13 is a functional block diagram of the operation unit in another embodiment for calculating a print exposure amount by using a plurality of kinds of information read from the photographic film shown in FIG. 12.

Referring to FIG. 13 showing the function of the operation unit the three color densities stored in the memory 62 are sent to a characteristic value deriving unit 116 to calculate an average density, average density at a particular area of a frame, and the like respectively for each color. As shown in FIGS. 5A to 5C, the average densities at particular areas include an average density Dc at the center of a frame an average density Df at the peripheral portion of a frame, an average density Dl at the lower half of a frame, an average density Dri at the right half of a frame, and an average density Dle at the left half of a frame. These areas are discriminated in accordance with the camera posture data read from the photographic film 18. The diagrams shown in FIGS. 5A to 5C are provided for the camera positioned horizontally.

By using the photographic condition data and average density at a particular area, a scene discrimination unit 117 discriminates a frame to be printed as one photographic scene of a night far scene (scene of a remote landscape, e.g. a whole town, at night photographed with a comparatively long exposure time), outdoor-at-night scene (scene of an outdoor image at night at an ordinary distance) or an indoor scene, a close-up scene, a daylight synchronized flash scene (scene photographed by use of a flash as a supplemental light in daylight), an under-exposed scene, a rear light scene, and other scenes. A print exposure amount calculating unit 118 uses the characteristic values outputted from a characteristic value deriving unit 116 and the scene discrimination results outputted from the scene discrimination unit 117 to calculate the print exposure amount $E_1$ by using for example, the following print exposure calculating equation and to send the print exposure amount $E_1$ to the controller 52:

$$E_1 = KD_{1j_i} \cdot (DN_i - D_i) + KD_{2j_i} + KD_{3j_i} \cdot Dmx_i + KD_{4j_i} \cdot Dmn_i + KD_{5j_i} \cdot (Dc_i - Df_i) + KD_{6j_i} \cdot (Dl_i - Du_i) + KD_{7j_i} \cdot (Dle_i - Dri_i) \quad (7)$$

where $KD_1$ to $KD_7$ are constants, and j is a coefficient determined by each discriminated scene.

The coefficients of the above print exposure amount calculating equation are varied with the scene discrimination so that an optimum print exposure amount $E_i$ for a particular scene can be determined. However, there are some scenes. Which cannot be printed properly if the above print exposure amount calculating equation is used. For such scenes, a correction amount is entered from the keyboard when the frames again are printed, the correction amount being added to or subtracted from, the calculated print exposure amount $E_i$, as is well known in the art.

The method of deriving the characteristic values by the characteristic value deriving unit 116 may be changed in accordance with the scene discrimination results from the scene discriminating unit 117, or a print exposure amount calculating equation different from the equation (7) may be used by the print exposure amount calculating unit 118 in accordance with the discriminated scene. For example, the exposure amount may be changed with the degree of matching the standard pattern provided for each scene, or a print exposure amount calculating equation using a flesh color density on a positive image may be used in accordance with the discriminated scene.

The operation of the embodiment shown in FIGS. 10 to 13 will be described with reference to FIG. 14. The camera posture taken at the time of determining the frame layout, is detected by the camera posture detecting device 95. The camera posture signal is encoded by the encoder 106 and sent to the photographing condition data generator 94. Upon half-depressing the release button, the distance to the principal objection is measured by the range finding unit 70, and the object brightness is measured by the photometric unit 90. An output signal from the light receiving element 92 of the photometric unit 90 is sent to the exposure control circuit 93 to calculate a light value (LV) by using the film sensitivity.

Upon full-depression of the release button, the lens setting mechanism 77 operates to move the taking lens 10 by the amount corresponding to the object distance detected by the range finding circuit 76. After setting the lens, the shutter 25 is program-controlled to have the aperture size and exposure time corresponding to the light value calculated by the exposure control circuit 93, so as to take the object image in the photographic film 18. If the object has a low brightness or an object is taken as a daylight synchronized flash photographic scene, the flash unit 96 emits a light in synchronism with the shutter 25 to illuminate the object.

Simultaneously with, or slightly before or after the photographing, the photographing condition data generator 94 converts the camera posture, presence/absence of flash emission, object distance, and light value into bar codes and sends them to the driver 16. The driver 16 drives the bar code recorder 17 to record the photographing condition data on the photographic film 18.

In the printing operation, immediately before the frame 18a to be printed is fed toward the printing stage, the bar code reader 45 reads the photographing condition data 110 to 114 represented by bar codes. The read bar codes are decoded by the decoder 46 so that the flash emission data 110, object brightness data 111, and object distance data 112 are sent to the scene discrimination unit 117. The camera posture data 114 is sent to the characteristic value deriving unit 116 to discriminate a particular area.

When the frame 18a is set at the printing stage, measurement points in the frame 18a are measured as described previously. The obtained three color densities are stored temporarily in the memory 62. Thereafter, the densities at each measurement point are read to derive therefrom the maximum density $Dmx_i$ and minimum density $Dmn_i$. Also the average density $D_i$ for the whole area of the frame is obtained as a mean value of densities at all measurement points. Further, areas are discriminated in accordance with the camera posture data 114 to calculate the average densities of respective areas. These characteristic values are sent to the print exposure amount calculating unit 118, and the average densities of particular areas are sent to the scene discrimination unit 117.

Figure 14:
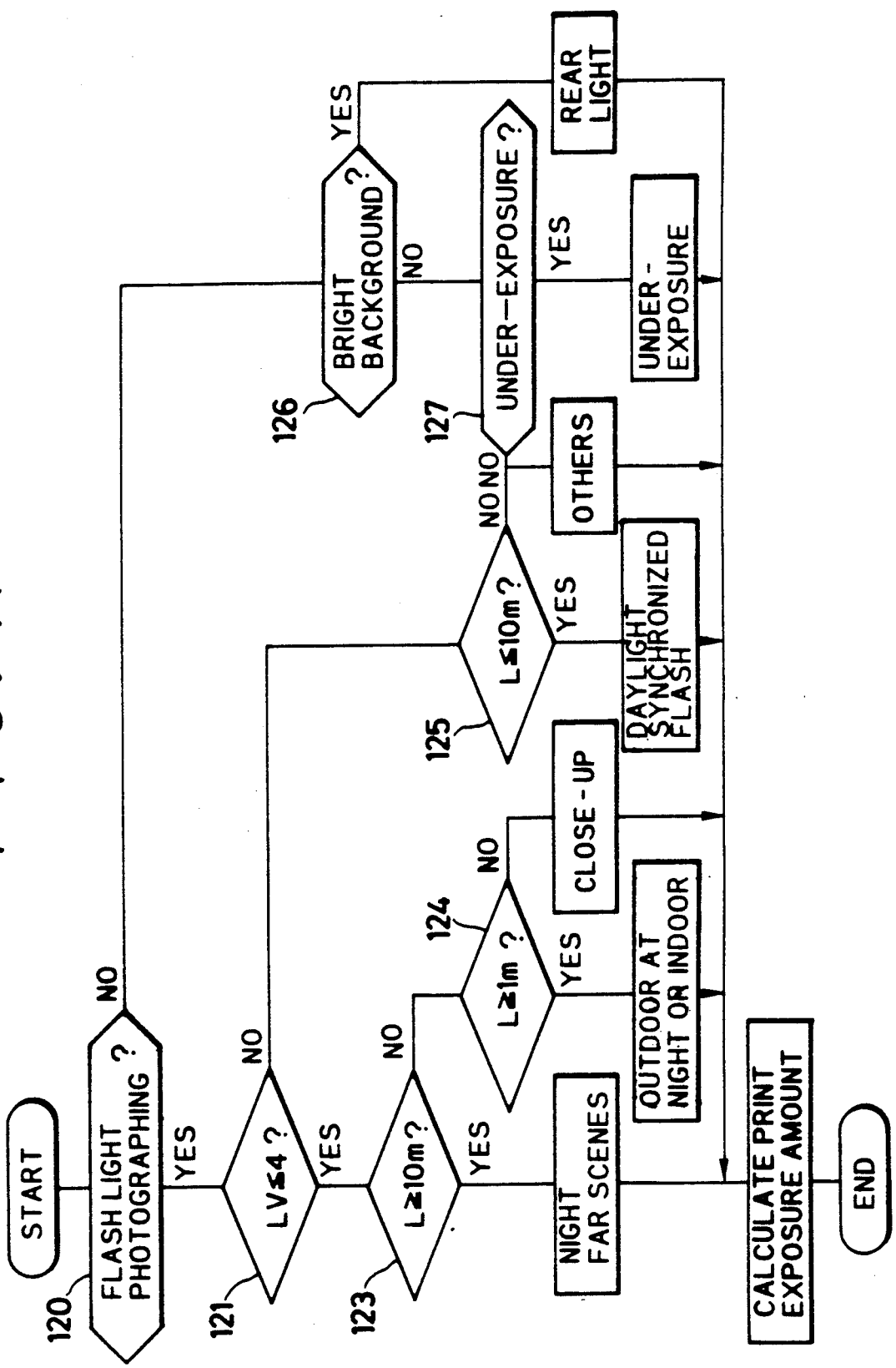
FIGS. 14 to 16 are flow charts illustrating the operation of scene discrimination.

As shown in FIG. 14, the scene discrimination unit 117 judges at step 120, based on the flash emission data 110, whether the frame 18a is a flash photographic scene. If the frame 18a is a flash photographic scene, then it is judged at step 121, based on the object brightness data 111, whether LV is equal to or smaller than "4". If it is judged that the scene is equal to or smaller than "4" then it is judged, at step 123, whether the principal object distance L is equal to or longer than 10 m. If the object distance L is equal to or longer than 10 m, then the frame 18a is a far distance, low brightness and flash photographic scene so that it is judged as a night far photographic scene.

If L < 10 m at step 123, then it is judged, at step 124, whether the object distance is equal to or longer than 1 m. If L ≧ 1 m at step 124, then the frame 18a is judged as an outdoor-at-night or indoor photographic scene. If L < 1 m at step 124, then the frame 18a is a near distance, low brightness and flash photographic scene, and so is judged as a close-up photographic scene.

If LV > 4 at step 121 then it is judged, at step 125, whether the object distance L is equal to or shorter than 10 m. If L ≦ 10 m at step 125, the frame 18a is judged as a daylight synchronized flash photographic scene, but if L > 10 m at step 125, then the frame 18a is judged as another type of scene.

If it is determined at step 120 that there is no flash, then it is judged at step 126 whether the background is bright. This judgment step is carried out by comparing the average density Dc at the central area of the frame with the average density Df at the peripheral area of the frame, as shown in FIG. 5A. If a bright background is identified at step 126 then the frame 18a is judged as a rear light photographic scene.

If no bright background is identified step 126, then it is judged, at step 127, whether the frame was underexposed. This judgment step is carried out by checking whether the average density Dm at the whole area of the frame is higher than a predetermined density. If under-exposure is affirmed at step 127, then the frame 18a is judged as an under-exposed scene; otherwise the frame is judged as another type of scene.

The print exposure amount calculating unit 118 determines $KD_{1j_i}$ to $KD_{7j_i}$ in accordance with the scene discrimination determined by the scene discrimination unit 117. The characteristic values calculated by the characteristic value deriving unit 116 are substituted into the print exposure calculating equation (7), having $KD_{j_i}$ to $KD_{7j_i}$ determined, to calculate the print exposure amount $E_i$ which then is sent to the controller 52.

Figure 15:
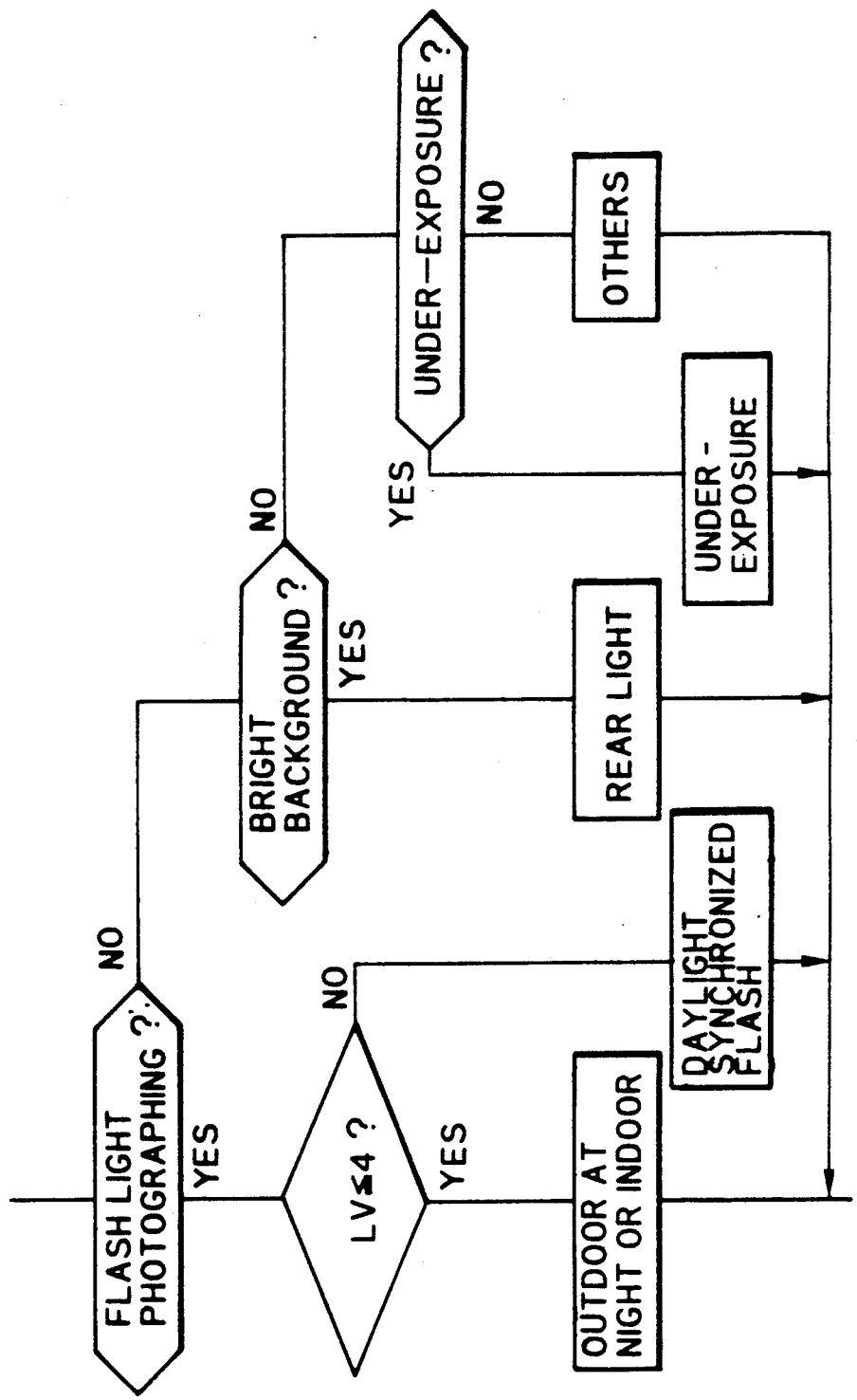
Figure 16:
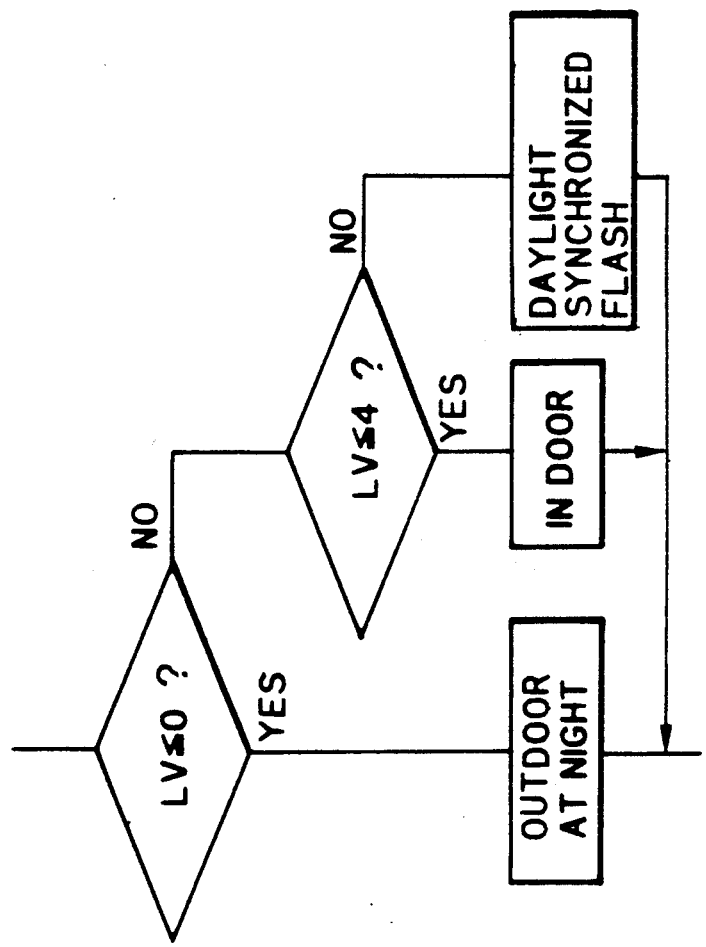

FIG. 15 shows another embodiment of scene discrimination. In this embodiment object distance data is omitted, in order to simplify the scene discrimination. Therefore, this embodiment therefore discriminates a scene as one of an outdoor-at-night or indoor photographic scene, daylight synchronized flash photographic scene, rear light photographic scene, or an underexposed scene, among others. With the scene discrimination shown in FIG. 16, only the object brightness data is used to discriminate a scene as one of three scenes, including an outdoor-at-night photographic scene, an indoor photographic scene, and a daylight synchronized flash photographic scene.

Figure 17:
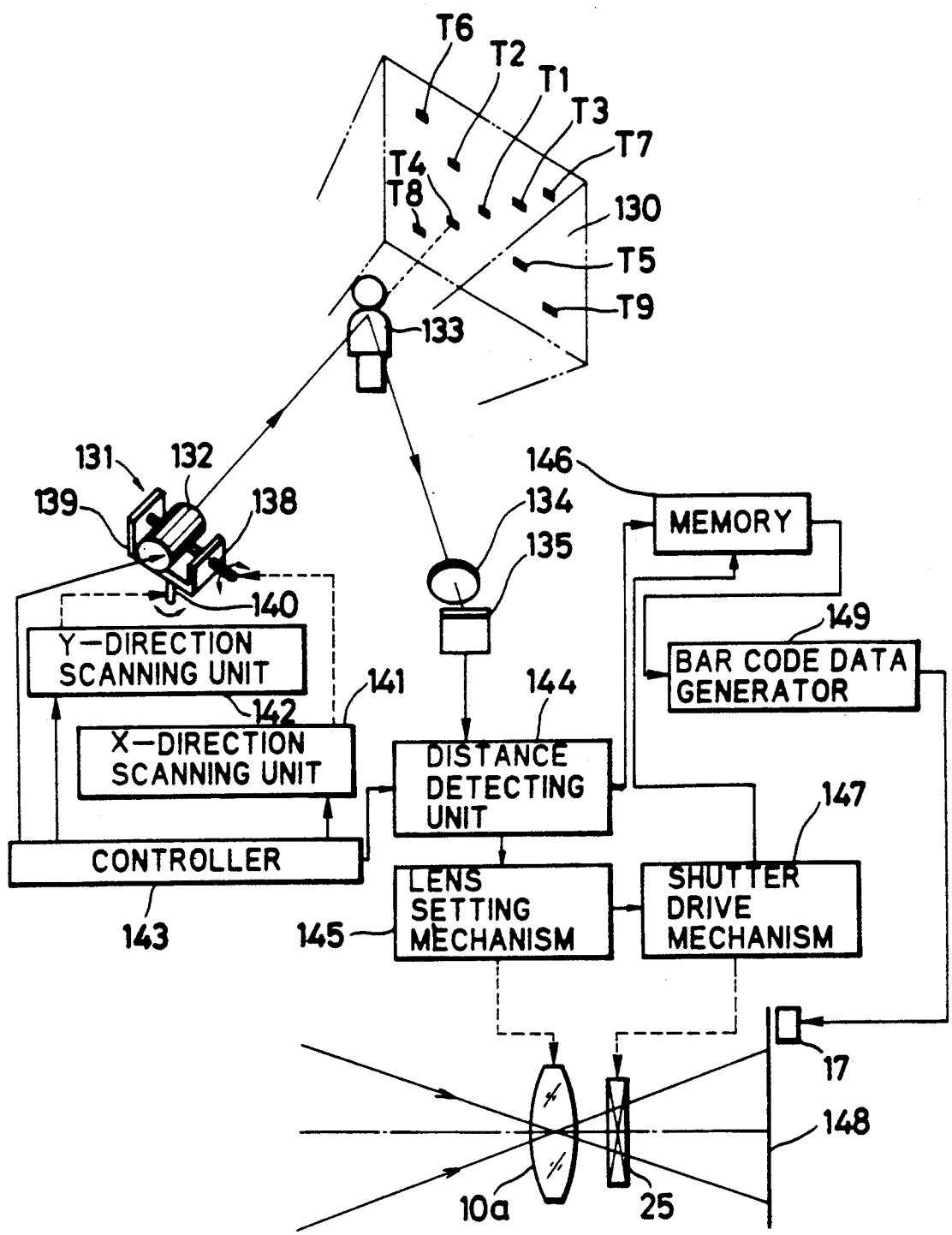
FIG. 17 is a schematic diagram showing a photographic camera which records the distance information detected at a plurality of range finding areas and the focussed object distance information used for the focussing of the taking lens.

FIGS. 17 to 21E show still another embodiment of this invention, wherein exposure control is conducted by using the distance information of an object present at each range finding area, as well as the distance information (distance to a principal object) used for focussing the taking lens. Referring to FIG. 17, a photographic scene 130 is shown schematically as a flat plane, and the range finding areas T1 to T9 are indicated on the photographic scene 130. A light projecting unit 131 projects an infrared spot light emitted from a light source 132 toward the photographic scene 130 to scan sequentially the range finding areas T1 to T9. During sequential scanning of the range finding areas T1 to T9, the infrared light reflected from an object 133 passes through a lens 134 and becomes incident on an incident position detecting device such as an image sensor 135. Presence or absence of the object 133 is detected based on whether a light reflected from the object 133 becomes incident on the image sensor 135 The incident position of the reflected light is used to measure the distance of the object 133.

An X-shaft 138 is mounted on the light source 132, the X-shaft 138 being rotatably mounted on a holder 139 on which a Y-shaft 140 is fixed. The X-shaft 138 is coupled to an X-direction scanning unit 141 whose pulse motor (not shown) causes the light source 132 to swing in the vertical direction. The Y-shaft 140 is coupled to a Y-direction scanning unit 142 which swings the light source in the horizontal direction. A controller controls the X- and Y-direction scanning units 141 and 142 to scan the light source 132 two-dimensionally. The controller 143 has a pulse counter which counts drive pulses supplied to the scanning units 141 and 142 in order to detect the scanning position of the light source 132 relative to the photographic scene. The light source 132 is allowed to emit light only when the range finding areas T1 to T9 are scanned. The position signals of the range finding areas T1 to T9 illuminated by the light source 132 are sent to a distance detecting unit 144.

This distance detecting unit 144 obtains the incident position of the reflected light on the basis of time sequential signals of the image sensor 135, and detects the distance to each object present within each range finding area T1 to T9 by using the incident position and the position signal of the range finding area. In the embodiment shown in FIG. 17, only the object 133 is present within the allowable limit of range finding (usually 4 to 5 m), so that the object distance obtained at the range finding are T4 is used as the focussed object distance (in-focus distance). If objects at different distances are present respectively within a plurality of range finding areas T1 to T9 the distance detecting unit 144 selects one of the object distances in accordance with a predetermined program. For instance, if a near distance photographic scene has priority over other scenes, then the shortest distance among a plurality of detected object distances is selected and sent to a taking lens setting mechanism 145.

The distances of respective range finding areas and the focussed object distance used for focussing an optical system 10a are sent to a memory 146. Numerical values in metric units are used as the distance information in this embodiment. The distance information may use other representations if they indicate a distance. For instance, a code representative of an in-focus condition is used for a range finding area corresponding to the object focussed distance, whereas a code representative of near distance is used for an object at a nearer distance. Also a code representative of far distance is used for an object at a far distance and a code representative of "absence" is used for an absent object. These codes are recorded in one-to-one correspondence with the range finding area on a photographic film.

Upon full depression of a release button (not shown), the taking lens setting mechanism 145 sets the optical system 10a at the position corresponding to the focussed object distance. A set completion signal from the optical system 10a causes a shutter drive mechanism 147 to operate so that the shutter 25 opens and closes to expose the photographic film 148. In synchronism with the operation of the shutter drive mechanism 147, the contents of the memory 146 are read to send the stored distance information for respective range finding areas and the focussed object distance to a bar code data generator 149. These two types of distance information are converted by the bar code data generator 149 into bar code data which then are sent to the bar code recorder 17.

Figure 18:
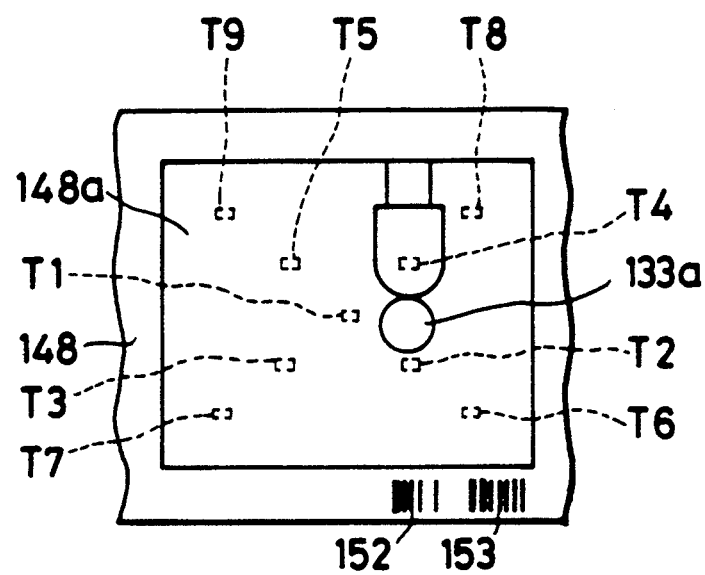
FIG. 18 illustrates a photographic film recorded with an object taken by the photographic camera shown in FIG. 17.

FIG. 18 shows an example of a developed photographic film. For convenience of description, the range finding areas T1 to T9 are represented by brackets. An image 133a of an object 133 is recorded in the frame 148a of a photographic film 148. The focussed object distance information 152 and distance information 153 of respective objects within the range finding areas are recorded outside the frame 148a. In this embodiment, the principal object 133 is positioned at the range finding area T4.

Figure 19:
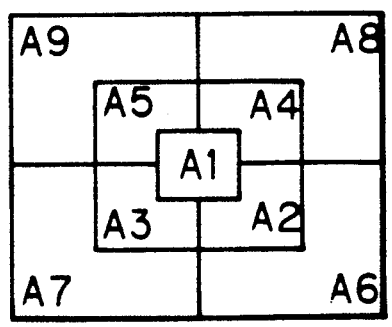
FIG. 19 is a diagram illustrating divisional frame areas.

FIG. 19 shows divisional frame areas used for deriving characteristic values. An image recorded in the photographic film 148 is divided into nine divisional frame areas A1 to A9 which correspond to the range finding areas T1 to T9. At least one characteristic value $DL_k$ (k being the number of each divisional frame area) is derived from the respective divisional frame areas A1 to A9. An image within a divisional frame area corresponding to the range finding area used for focussing is regarded as a principal image. Images with divisional frame areas other than the above-mentioned divisional frame area, corresponding to the range finding areas from which objects were detected, are regarded as secondary principal images. Images other than the primary principal image and secondary principal images are regarded as a background image.

For secondary principal images and a background image, the average density for the whole area of a frame is used as the characteristic value $DL_k$. This average density is a mean value of densities for all measurement points within the whole area of a frame.

For the principal image, on the condition that there are measurement points in the predefined flesh color range on a positive image one of the median, average value, and central value of flesh color measurement points is used as the characteristic value $DL_k$. If there is no flesh color measurement point, the maximum density is used as the characteristic value $DL_k$. A combination of a plurality of values, such as a combination of the median of flesh color measurement points and the maximum density may be used as the characteristic value $DL_k$. Instead of these values, the average density also may be used.

The obtained characteristic values $DL_k$ of the divisional frame areas A1 to A9 are used to calculate the print exposure amount $E_C$. In this embodiment, the exposure correction value $E_C$ is calculated according to the following equation (8). based on the characteristic values $DL_k$ of the divisional frame areas.

$$E_C = \Sigma K_k \cdot DL_k \tag{8}$$

where the weighting coefficient $K_k$ is represented by the following function in equation (9), using as its variables the focussed object distance $L_0$ and the distance $L_k$ for the range finding area:

$$K_k = f(L_k - L_0) \tag{9}$$

The print exposure amount $E_i$ is obtained by:

$$E_i = a_i(D_i - DN_i) + \beta i + E_C \tag{10}$$

Figure 20:
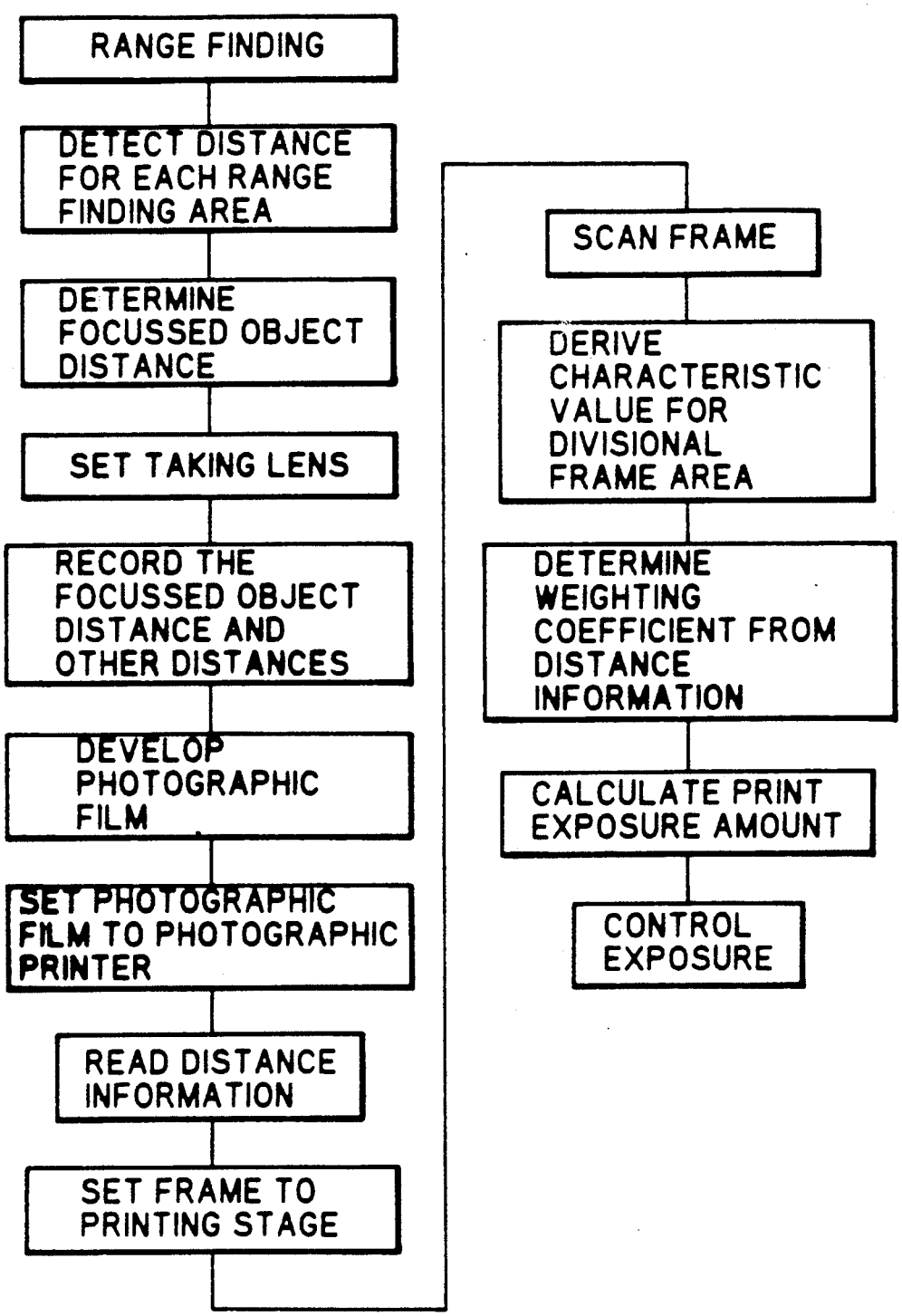
FIG. 20 is a flow chart illustrating the processing operation from photographing using the photographic camera shown in FIG. 17, to printing.

The operation of the above embodiment now will be described with reference to FIG. 20. In the range finding operation, the controller 143 actuates the Y-direction scanning unit 142 to rotate the holder 139 by means of the Y-shaft 140. The holder 139 causes the light source 132 to rotate in the Y-direction (horizontal direction). During the predetermined period of this rotation, the light source 132 emits an infrared light which scans the range finding area T6, and next the range finding area T7. After scanning the range finding area T7, the light source 132, together with the holder 139, rotates in the reverse direction to restore the initial position with respect to the Y-direction.

Upon restoration of the initial position by the light source 132, the controller 143 then actuates the X-direction scanning unit 141 to rotate the X-shaft 138 in the clockwise direction by a predetermined angle. Immediately thereafter, the controller 143 actuates the Y-direction scanning unit 142 to rotate the light source 132 in the Y-direction. During the predetermined period of this rotation, the light source 132 emits an infrared light to scan the range finding area T2. In a similar manner, the range finding areas T3, T1, T4, T5, T8 and T9 are scanned sequentially.

Since it is assumed that the object 133 is present within the range finding area T4 the infrared light reflected by the object 133 becomes incident on the image sensor 135 via the lens 134. The time sequential signal read from the image sensor 135 is sent to the distance detecting unit 144 to detect the position of incidence. Since the position signal of the light source 132 is also supplied to the distance detecting unit 144, the range finding area now concerned can be discriminated. The distance to the object can be detected using the range finding area and the reflected light incident position. The object distance detected for each range finding area is stored in the memory 146.

If there are objects detected at a plurality of range finding areas, in a manner similar to that of conventional automatic focussing the distance detecting unit 144 reads the data in the memory 146 to select one of the object distances in accordance with the near distance priority, or middle distance priority or the like. The selected object distance is the distance to the principal object; this distance, which is used as the focussed object distance, is sent to the taking lens setting mechanism 145.

Upon full depression of the release button after the range finding operation, the taking lens setting mechanism 145 sets the optical system 10a at the position corresponding to the focussed object distance. After this lens setting, the shutter drive mechanism 147 opens and closes the shutter 25 at a predetermined speed so that the photographic scene 130 is taken in a photographic film 148. Immediately after photographing, reading of the memory 146 is started, and the read object distances for respective range finding areas and the focussed object distance are sent to the bar code data generator 149. The bar code signals outputted from the bar code data generator 149 are sent to the bar code recorder 17 to record the focussed object distance information 152 and distance information 153 for respective range finding areas.

As described previously, after the photographic film 148 is developed, it is sent to the photographic printer shown in FIG. 3. In printing a frame, the focussed object distance information 152 and the distance information 153 for respective range finding areas recorded in the frame are read, and the three color densities for measurement points in the frame are measured, so as to calculate the print exposure amount for each color in the operation unit 47. First by comparing the distance $L_k$ to an object within each range finding area with the focussed object distance $L_0$ each image in the range finding area is discriminated as a primary principal image, a secondary principal image or a background image. By using the densities at measurement points within each divisional frame area, the predetermined characteristic value $DL_k$ corresponding to the image discrimination is calculated.

Next, a difference between the focussed object distance $L_0$ and each distance $L_k$ to an object within a range finding area is obtained. Then, the weighting coefficient $K_k$ is determined such that the coefficient is associated to a decreasing extent with the print exposure amount as the difference between $L_0$ and $L_k$ increases. i.e., as the distance from the principal object increases. The characteristic value $DL_k$ of each divisional frame area and the corresponding weighting coefficient $K_k$ are substituted into the equation (8) to calculate the correction amount $E_C$. This correction amount $E_C$ and the average density $D_i$ of the frame to be printed are substituted into the calculating equation (10) to calculate the print exposure amount $E_i$ for each color.

FIGS. 21A to 21E illustrate photographic scenes and their in-focus states. The range finding area in focus is shown painted in black. It should be noted that the term "background" here means images within a frame other than the principal image, and that a "foreground image" other than the principal image is included in the background.

Figure 21A:
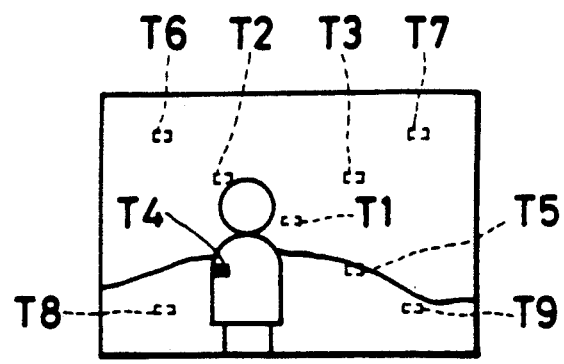
FIG. 21A to 21E illustrate various scenes to be taken.

FIG. 21A shows a photographic scene with a mountain background. The focus of the optical system 10a is adjusted in correspondence with the distance to an object detected within the range finding area T4. The image within the divisional frame area A4 is regarded as the principal image of the whole frame including this scene. A weighting coefficient $K_4$ of "1.0" is used for the characteristic value $DL_4$ derived from the divisional frame area A4. A weighting coefficient of "0.0" is used for all other divisional frame areas because the distances to all other objects are infinite. In many cases, an object in the lower area of a frame is a landscape, so that the divisional frame areas A4, A8 and A9 preferably are regarded as a far distance scene, and a small weighting coefficient of "0.2" is used.

Figure 21B:
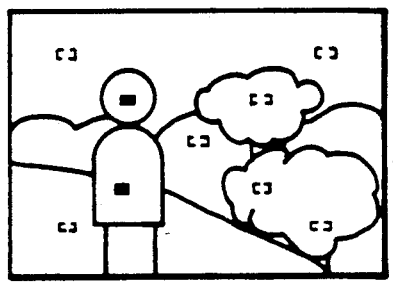

FIG. 21B is a figure photographic scene with flowers in its background. A weighting coefficient of "1.0" is used for the divisional frame areas A2 and A4 constituting the primary principal image of this photographic scene, and a weighting coefficient of "0.2" is used for the divisional frame areas A1, A3, A5, A8 and A9 constituting the secondary principal image. For the remaining divisional frame areas, a weighting coefficient of "0.0" is used.

Figure 21C:
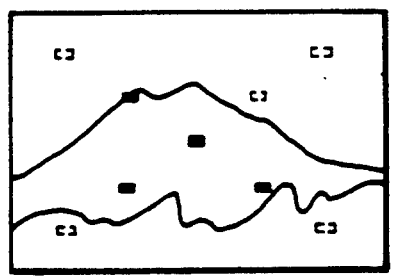

In the photographic scene shown in FIG. 21C, a weighting coefficient of "1.0" is used for the divisional frame areas A1, A2, A3, A4, A6 and A7 constituting the principal image and a weighting coefficient of "0.2" is used for the divisional frame areas A8 and A9 constituting the foreground image.

Figure 21D:
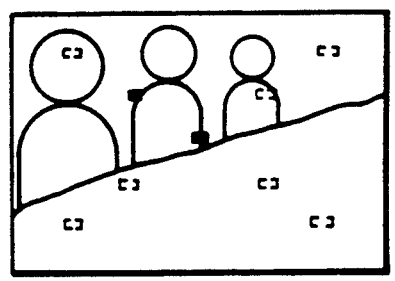

In the photographic scene shown in FIG. 21D, a weighting coefficient of "1.0" is used for the divisional frame areas A1 and A2, and a weighting coefficient of "0.4" is used for the divisional frame areas A3 to A6 A8 and A9.

Figure 21E:
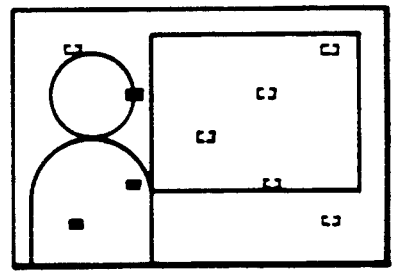

In the photographic scene shown in FIG. 21E, a weighting coefficient of "1.0" is used for the divisional frame areas A4, A5 and A8 constituting the principal image and a weighting coefficient of "0.4" is used for the divisional frame area A9.

A rectangular image, having a size corresponding to the focussed object distance and its center at such a position in the frame as corresponds to the range finding area in focus may be regarded as the principal image, and the remaining frame area may be regarded as the background image. In this case, the print exposure amount is calculated by weighting the characteristic value M derived from the principal image and the characteristic value B derived from the background image, namely, $$\log E_i = K1 \cdot M + K2 \cdot B \qquad (11)$$

where K1 and K2 are weighting coefficients, for example, K1 = 1.0 and K2 = 0.2. If the principal image is at a far or very near distance, or is small in size, than it may be considered that there is no principal image. In this case, the print exposure amount may be determined by the central area emphasizing photometry method. Further, a divisional frame area, which has a density difference from the principal image equal to or larger than a predetermined value, may not be used in calculating the print exposure amount, or a small weighting coefficient may be used for this area to reduce the contribution of this area to exposure control.

Further, scene discrimination may be carried out in accordance with the focussed object distance and the distance to the background image, and the print exposure amount may be calculated by selecting a calculating equation predetermined for each discriminated scene.

I. Near focussed object distance (shorter than 1.2 m)
(1) Near background
   The photographic scene is regarded as a "close-up scene".
(2) Middle background (1.2 to 3 m)
   The photographic scene is regarded as a general indoor or outdoor scene.
(3) Far background (equal to or longer than 3 m)
   The photographic scene is regarded as a portrait taken in a large space.
II. Middle focussed object distance
(1) Near background
   The photographic scene is regarded as a portrait with a foreground image.
(2) Middle background The photographic scene is regarded as a general indoor or outdoor scene.

(3) Far background

The photographic scene is regarded as a portrait taken in a large space.

III. Far focussed object distance (1) Near background

The photographic scene is regarded as a landscape scene with a foreground image.

(2) Middle background

The photographic scene is regarded as a landscape scene with a foreground image.

(3) Far background (equal to or longer than 3 m)

The photographic scene is regarded as a landscape scene.

In the above embodiments, the density correction amount is calculated by using the distance information. This invention may also be used for calculating a color correction amount. Instead of recording the distance information in a photographic film, it may be recorded in a separate recording medium such as an IC card, a magnetic area at the periphery of a film patrone, or in a recording medium coupled to a photographic film. The invention also is applicable to the situation in which an image recorded with an electronic still camera is to be printed. Using an electronic still camera, the image-recording condition data together with the image data is written to a magnetic floppy disk. In the case where an image is displayed on a CRT for example, and printed on a color paper by a digital color printer the object image distance information is read to control the exposure amount of each point constituting the image. Furthermore, another type of distance information also may be used in place of the bar code used for representing the distance information. A mark may be recorded in a photographic film using a light emitting diode, for example, so that the distance information can be discriminated based on a presence/absence of this mark.

While the invention has been described in detail above with reference to a preferred embodiment, various modifications within the scope and spirit of the invention will be apparent to people of working skill in this technological field. Thus, the invention should be considered as limited only by the scope of the appended claims.

WHAT IS CLAIMED IS:

1. A photographic printing method for printing an image of an object on a photosensitive material, said image having been taken by an image taking device, said method comprising the steps of:
   reading distance information of said object from a recording medium said distance information corresponding to a distance of said object from said image taking device; and
   controlling a print exposure amount of said image to be printed on said photosensitive material, in accordance with said distance information.

2. A photographic printing method according to claim 1, wherein said recording medium is a photographic film, and said distance information is recorded on said photographic film.

3. A photographic printing method according to claim 2, wherein said distance information is recorded in the form of a bar code.

4. A photographic printing method according to claim 1, wherein said recording medium is a magnetic recording medium.

5. A photographic print method for printing a frame, recorded on a photographic film, on a photosensitive material comprising the steps of:
   reading distance information of a principal object, within said frame from an image taking device which photographed said frame, said distance information having been recorded at the time of photographing;
   obtaining photometric values at respective measurement points within said frame;
   selecting effective measurement points from said measurement points by taking into consideration said distance information;
   obtaining characteristic values in accordance with photometric values at said effective measurement points; and
   calculating a print exposure amount by using said characteristic values.

6. A photographic printing method according to claim 5, wherein said distance information is recorded on said photographic film in an area outside said frame.

7. A photographic printing method according to claim 5 wherein selecting said effective measurement points is carried out such that, if a contrast between two adjacent measurement points out of said measurement points is equal to or larger than a reference value which is predetermined in accordance with said distance information, then said two adjacent measurement points are used as said effective measurement points.

8. A photographic printing method according to claim 5, wherein said effective measurement point selecting step comprises:
   dividing said frame into a non-judgement area and a judgement area in accordance with said distance information;
   using all measurement points within said non-judgement area for said effective measurement points: and
   selecting said effective measurement points such that, if the contrast between two adjacent measurement points out of said measurement points within said judgment area is equal to or larger than a reference value, then said two adjacent measurement points are used as said effective measurement points.

9. A photographic printing method for printing a frame recorded in a photographic film on a photosensitive material, comprising the steps of:
   reading distance information of a principal object, within said frame, from an image taking device which photographed said frame said distance information having been recorded at the time of photographing; obtaining photometric values at respective measurement points within said frame;
   selecting an effective area within said frame in accordance with said distance information;
   deriving characteristic values from photometric values at measurement points within said effective area out of said respective measurement points; and
   calculating a print exposure amount by using said characteristic values.

10. A photographic printing method according to claim 9, wherein said distance information is recorded on said photographic film in an area outside said frame.

11. A photographic printing method for printing a frame on a photosensitive material, comprising the steps of:
    reading flash emission data from a recording medium, said flash emission data having been recorded at the time of taking of said frame, and representing whether an image to be printed was taken by using a flashing device;

obtaining a discriminated scene of said frame in accordance with said flash emission data; and calculating a print exposure amount by selecting a calculating equation according to said discriminated scene from calculating equations prepared for different types of scenes.

12. A photographic printing method according to claim 11, further comprising the steps of reading distance information of a principal object within said frame, recorded on a recording medium, from an image taking device which took said image, and discriminating a scene of said frame in accordance with said flash emission data and said principal object distance information.

13. A photographic printing method according to claim 12, further comprising the steps of reading brightness data of an object recorded in said recording medium, and discriminating a scene of said frame in accordance with said flash emission data, said distance information, and said object brightness data.

14. A photographic printing method according to claim 13, wherein said recording medium is a photographic film, and said distance information, flash emission data and object brightness data are recorded in the area outside said frame.

15. A photographic printing method for printing a frame on a photosensitive material, comprising the steps of:

reading distance information of an object present within respective range finding areas, from an image taking device which took an image of said object, and focussed object distance information included in said distance information, from a recording medium, said focussed object distance information having been used for the focussing of a taking lens; and calculating a print exposure amount in accordance with said distance information and said focussed object distance information.

16. A photographic printing method according to claim 15, wherein said print exposure amount is calculated by dividing said frame into a plurality of divisional frame areas in correspondence to a plurality of said range finding areas, obtaining characteristic values for said respective divisional frame areas, weighting said characteristic values in accordance with each difference between said focussed object distance information and said distance information in each of said range finding areas corresponding to said divisional frame areas, and adding together said weighted characteristic values.

17. A photographic printing method according to claim 15, wherein said recording medium is a photographic film, and said distance information is recorded on said photographic film in an area outside said frame.

18. An apparatus for recording distance information of an object in a recording medium, comprising:

means for generating said distance information of said object by detecting a distance of said object from an image taking device which takes an image of said object; and means for recording said distance information in said recording medium.

19. A photographic printing apparatus according to claim 18, wherein said recording medium is a magnetic recording medium.

20. An apparatus according to claim 18, wherein said recording medium is a photographic film, and said distance information is recorded on said photographic film in an area outside a frame within which said object is photographed.

21. An apparatus according to claim 20, wherein said distance information generating means comprises a sensor for detecting a setting position of a taking lens to photograph said object and means for converting a signal from said sensor into said distance information.

22. An apparatus according to claim 20, wherein said distance information generating means comprises range finding means for automatically detecting said distance of said object, and means for converting a signal from said range finding means into said distance information.

23. An apparatus according to claim 22 wherein said range finding means comprises an ultrasonic range said signal being an ultrasonic signal.

24. An apparatus according to claim 22, wherein said range finding means comprises a light-emitting range finder, said signal being a light signal.

25. An apparatus according to claim 20, wherein said recording means comprises a display panel disposed facing said photographic film, and a light source for applying a light to said display panel from behind said display panel to record said distance information displayed on said display panel in said photographic film.

26. An apparatus according to claim 25, wherein said display panel comprises a liquid crystal panel.

* * * * *

UNITED STATES PATENT AND TRADEMARK OFFICE
CERTIFICATE OF CORRECTION

PATENT NO. : 5,023,656
DATED : Jun. 11, 1991
INVENTOR(S) : Takaaki TERASHITA

It is certified that error appears in the above-indentified patent and that said Letters Patent is hereby corrected as shown below:

Col. 24, line 16, delete "A photographic printing" and insert --An--.

Signed and Sealed this

Twenty-third Day of August, 1994

Attest:

BRUCE LEHMAN

Attesting Officer

Commissioner of Patents and Trademarks